United States Patent
Baek

(10) Patent No.: US 10,202,076 B2
(45) Date of Patent: Feb. 12, 2019

(54) UNDER VEHICLE IMAGE PROVISION APPARATUS AND VEHICLE INCLUDING THE SAME

(71) Applicant: LG ELECTRONICS INC., Seoul (KR)

(72) Inventor: Iljoo Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 649 days.

(21) Appl. No.: 14/875,918

(22) Filed: Oct. 6, 2015

(65) Prior Publication Data
US 2016/0101734 A1    Apr. 14, 2016

(30) Foreign Application Priority Data
Oct. 13, 2014    (KR) .................. 10-2014-0137813

(51) Int. Cl.
| | | |
|---|---|---|
| *B60R 1/00* | (2006.01) | |
| *H04N 5/225* | (2006.01) | |
| *H04N 7/18* | (2006.01) | |
| *H04N 5/232* | (2006.01) | |
| *G06T 11/60* | (2006.01) | |
| *G06K 9/00* | (2006.01) | |
| *B60R 11/04* | (2006.01) | |

(52) U.S. Cl.
CPC .............. *B60R 1/00* (2013.01); *B60R 1/002* (2013.01); *B60R 11/04* (2013.01); *G06K 9/00771* (2013.01); *G06K 9/00832* (2013.01); *G06T 11/60* (2013.01); *H04N 5/2253* (2013.01); *H04N 5/23293* (2013.01); *H04N 7/181* (2013.01); *B60R 2300/101* (2013.01); *B60R 2300/102* (2013.01); *B60R 2300/105* (2013.01); *B60R 2300/205* (2013.01); *B60R 2300/303* (2013.01); *B60R 2300/607* (2013.01); *B60R 2300/802* (2013.01); *B60R 2300/8093* (2013.01)

(58) Field of Classification Search
CPC ..................................................... B60R 1/00
See application file for complete search history.

(56) References Cited

U.S. PATENT DOCUMENTS 8,576,286 B1    11/2013  Childs
2006/0022808 A1    2/2006  Ito et al.
(Continued)

FOREIGN PATENT DOCUMENTS

JP    H09-52555    2/1997
JP    2000-255319    9/2000
(Continued)

OTHER PUBLICATIONS

Office Action issued in Korean Application No. 10-2014-0137813 dated Nov. 23, 2015, 8 pages.
(Continued)

*Primary Examiner* — James M Pontius
(74) *Attorney, Agent, or Firm* — Fish & Richardson P.C.

(57) ABSTRACT

An under vehicle image provision apparatus includes a plurality of bottom view cameras mounted to a bottom of a vehicle, a processor configured to generate an under vehicle image including tires of a vehicle based on images accessed from the bottom view cameras, and a display unit configured to display the under vehicle image. As such, an image showing the underside of the vehicle may be provided.

17 Claims, 28 Drawing Sheets

(56) References Cited

U.S. PATENT DOCUMENTS

2013/0128048 A1* 5/2013 Okajima .................. B60R 1/00
                                                      348/148
2014/0232851 A1   8/2014 Hough et al.

FOREIGN PATENT DOCUMENTS

| | | |
|---|---|---|
| JP | 2001-180239 | 7/2001 |
| JP | 2004-354236 | 12/2004 |
| JP | 2010-164521 | 7/2010 |
| JP | 2011-168163 | 9/2011 |
| JP | 2013-253402 | 12/2013 |
| KR | 10-2009-0105264 | 10/2009 |
| KR | 10-2011-0101423 | 9/2011 |
| KR | 10-2012-0130453 | 12/2012 |

OTHER PUBLICATIONS

Extended European Search Report issued in European Application No. 15189484.7 dated Jun. 14, 2016, 17 pages.

* cited by examiner (a)   (b)

UNDER VEHICLE IMAGE PROVISION APPARATUS AND VEHICLE INCLUDING THE SAME

CROSS-REFERENCE TO RELATED APPLICATION

This application claims the priority benefit of Korean Patent Application No. 10-2014-0137813, filed on Oct. 13, 2014 in the Korean Intellectual Property Office, the disclosure of which is incorporated herein by reference.

FIELD

The present disclosure relates to an under vehicle image provision apparatus and a vehicle including the same and, for example, an under vehicle image provision apparatus that is capable of providing an image showing the underside of a vehicle and a vehicle including the same.

BACKGROUND

A vehicle is a device that transports a user in a desired direction. A representative example of the vehicle may be a car.

In order to enhance convenience of a user who uses the vehicle, the vehicle has been equipped with various sensors and electronic devices. In particular, various devices to enhance traveling convenience of the user have been developed. An image captured by a rear view camera is provided at the time of driving the vehicle in reverse or at the time of parking the vehicle.

SUMMARY

In one aspect, an under vehicle image provision apparatus comprising a plurality of bottom view cameras mounted to a bottom of a vehicle and a processor configured to generate an under vehicle image including tires of the vehicle. The processor is configured to generate the under vehicle image by accessing images captured by the plurality of bottom view cameras and combining the accessed images from the bottom view cameras into the under vehicle image. The under vehicle image provision apparatus also comprises a display unit configured to display the under vehicle image.

Implementations may include one or more of the following features. For example, the apparatus may include a plurality of around view cameras located above the plurality of bottom view cameras. In this example, the processor is configured to generate an around view image by combining a plurality of images accessed from the around view cameras based on a speed of the vehicle being a first speed or less or based on the vehicle being driven in reverse. The around view image may include the under vehicle image and the display unit may be configured to display the around view image including the under vehicle image.

In some implementations, the around view cameras may include a front view camera configured to capture an image of a front of the vehicle, a rear view camera configured to capture an image of a rear of the vehicle, a right side view camera configured to capture an image of a right side of the vehicle, and a left side view camera configured to capture an image of a left side of the vehicle. In these implementations, first and second bottom view cameras among the plurality of bottom view cameras may be respectively tilted front view and rear view cameras.

The processor may be configured to control at least one of the bottom view cameras to move based on at least one of a traveling direction, speed, or tilt of the vehicle. The processor also may be configured to generate the under vehicle image including the underside of the vehicle using the bottom view cameras at a time of stopping the vehicle and generate the under vehicle image including tires or an engine room of the vehicle using the bottom view cameras at the time of parking or starting the vehicle. The processor further may be configured to calculate an air pressure of each tire based on the under vehicle image including the tires and control output of a tire air pressure injection message based on the calculated tire air pressure.

In some examples, the apparatus may include a memory configured to store an under vehicle image captured at a time of parking the vehicle. In these examples, the processor may be configured to compare the under vehicle image acquired using the bottom view cameras with the under vehicle image stored in the memory and, based on the comparison, determine whether any irregularity exists at an underside of the vehicle, at a time of starting the vehicle.

In some implementations, the processor may be configured to vary a tilting angle of at least one of the bottom view cameras based on a tilt of the vehicle. In these implementations, the processor may be configured to vary the tilting angle such that an image capture area of at least one of the bottom view cameras increases as the tilt of the vehicle increases during traveling of the vehicle.

In addition, the processor may be configured to output, based on the under vehicle image acquired using the bottom view cameras, a notification message with respect to a predetermined object based on the object being detected in the under vehicle image. Also, the processor may be configured to calculate tire wear based on a tire image included in the under vehicle image and control output of a tire replacement message based on the tire wear. Further, the processor may be configured to determine whether leakage of engine oil occurs based on the under vehicle image and control output of an oil leakage message upon determining that leakage of engine oil occurs. And, the processor may be configured to identify, based on the under vehicle image, a road surface state from any one of a dry state, a wet state, a snow covered state, and an icy state and control output of information related to the identified road surface state.

In some examples, the apparatus may include a thermal imaging camera configured to sense heat at an underside of the vehicle. In these examples, the processor may be configured to calculate a tire temperature of the vehicle based on a thermally sensed image from the thermal imaging camera and control output of a warning message based on the calculated tire temperature of the vehicle being a predetermined temperature or more.

The processor may be configured to control display of an aligned state of tires of the vehicle on the display unit based on the under vehicle image including the tires of the vehicle. The processor also may be configured to control display of an under vehicle image excluding an image of tires of the vehicle on the display unit based on a traveling speed of the vehicle being a particular speed or more.

In some implementations, the apparatus may include a luminance sensor configured to sense a luminance at the underside of the vehicle. In these implementations, the apparatus may include first and second bottom lamps configured to be operated based on the luminance.

In some examples, the apparatus may include an indoor camera mounted in an interior of the vehicle. In these examples, the processor may be configured to recognize a driver's gaze based on an image transmitted from the indoor camera and vary a tilting angle of at least one of the bottom view cameras based on the driver's gaze.

In another aspect, a vehicle includes a steering drive unit configured to drive a steering device, a brake drive unit configured to drive a brake device, and a power source drive unit configured to drive a power source. The vehicle also includes a plurality of bottom view cameras mounted to a bottom of the vehicle and a processor configured to generate an under vehicle image including an image of tires of the vehicle. The processor is configured to generate the under vehicle image by accessing images captured by the plurality of bottom view cameras and combining the accessed images from the bottom view cameras into the under vehicle image. The vehicle further includes a display unit configured to display the under vehicle image.

Implementations may include one or more of the following features. For example, the vehicle may include a plurality of around view cameras located above the plurality of bottom view cameras. In this example, the processor may be configured to generate an around view image by combining a plurality of images accessed from the around view cameras based on a speed of the vehicle being a first speed or less or based on the vehicle being driven in reverse. The around view image may include the under vehicle image and the display unit may be configured to display the around view image including the under vehicle image.

DETAILED DESCRIPTION

A vehicle as described in this specification may include a car and a motorcycle. Hereinafter, a description will be given based on a car.

In some implementations, a vehicle as described in this specification may include a vehicle having an internal combustion engine as a power source, a hybrid vehicle having an internal combustion engine and an electric motor as a power source, and an electric vehicle having an electric motor as a power source, for example.

In some examples, an under vehicle image provision apparatus as described in this specification may be an apparatus including a plurality of cameras, which combines a plurality of images captured by the cameras to generate an around view image. In particular, the under vehicle image provision apparatus may be a vehicle-based apparatus that provides a top view or bird's eye view. Hereinafter, a description will be given of various implementations of an under vehicle image provision apparatus and a vehicle including the same.

Figure 1:
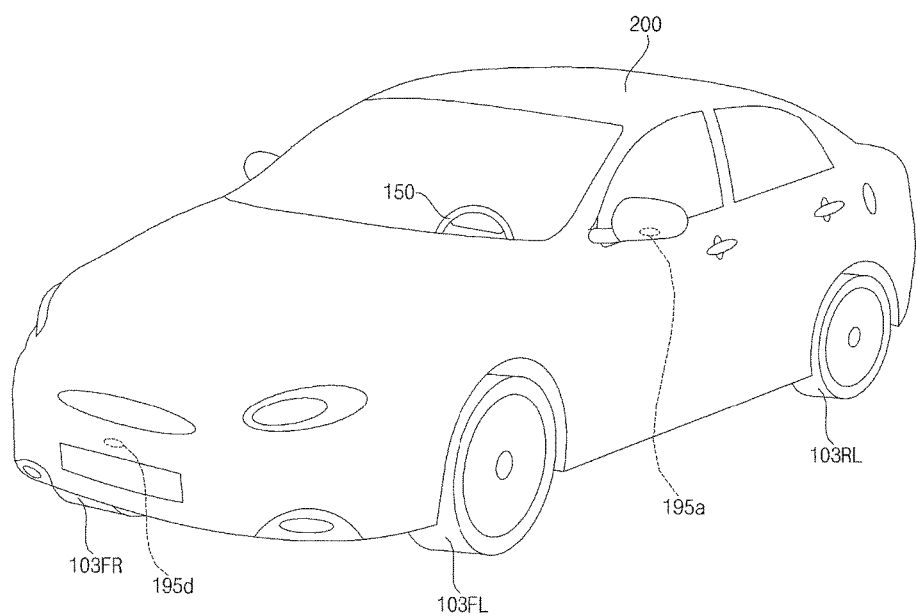
FIG. 1 is a view illustrating an example external appearance of a vehicle.

FIG. 1 illustrates an example external appearance of a vehicle. Referring to FIG. 1, the vehicle, designated by reference numeral 200, may include wheels including a front-right wheel 103FR, a front-left wheel 103FL, a rear-right wheel, and a rear-left wheel 103RL, a steering wheel 150 to steer the vehicle 200, and a plurality of around view cameras 195a, 195b, 195c and 195d (see FIG. 2A) mounted to the vehicle 200. In FIG. 1, only the three wheels 103FR, 103FL and 103RL and only a left side view camera 195a and a front view camera 195d are illustrated for the sake of illustration convenience.

Although not illustrated in FIG. 1, the vehicle 200 may further include a plurality of bottom view cameras 196 (see FIG. 2A) to capture an under vehicle image.

The bottom view cameras 196 (see FIG. 2A) may be activated to capture images respectively when a vehicle speed is a first speed or less or when the vehicle is driven in reverse. The images captured by the bottom view cameras 196 (see FIG. 2A) may be signal-processed in the under vehicle image provision apparatus 100 (see FIG. 3A or FIG. 3B).

Through provision of the bottom view cameras 196 (see FIG. 2A), an under vehicle image including tires of the vehicle 200 may be provided, which allows a driver to simply check the orientation of tires of the vehicle 200 and the state of the underside of the vehicle 200.

Figure 2A:
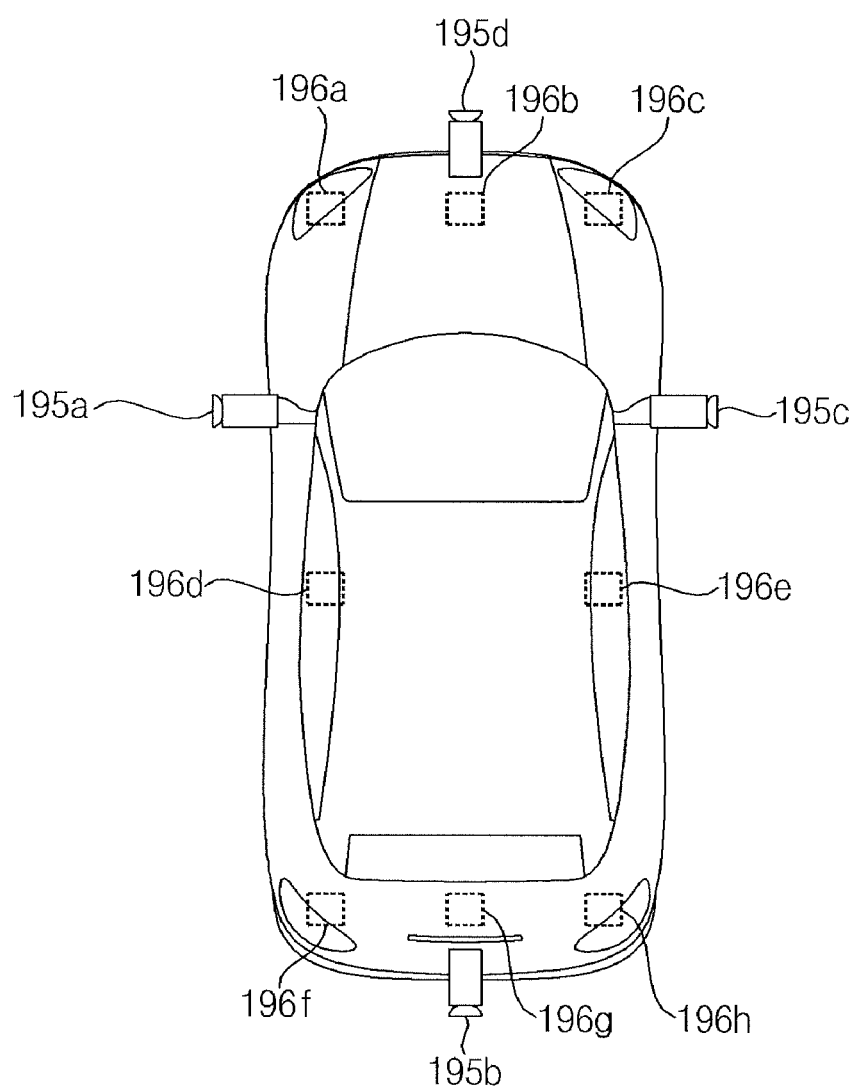
FIG. 2A is a view schematically illustrating an example of positions of a plurality of cameras attached to the vehicle of FIG. 1.

In addition, the around view cameras 195a, 195b, 195c and 195d may be referred to as top view cameras in contrast with the bottom view cameras 196 (see FIG. 2A).

The around view cameras 195a, 195b, 195c and 195d may be activated to capture images respectively when a vehicle speed is a first speed or less or when the vehicle is driven in reverse. The images captured by the around view cameras 195a, 195b, 195c and 195d may be signal-processed in the under vehicle image provision apparatus 100 (see FIG. 3A or FIG. 3B).

Figure 2B:
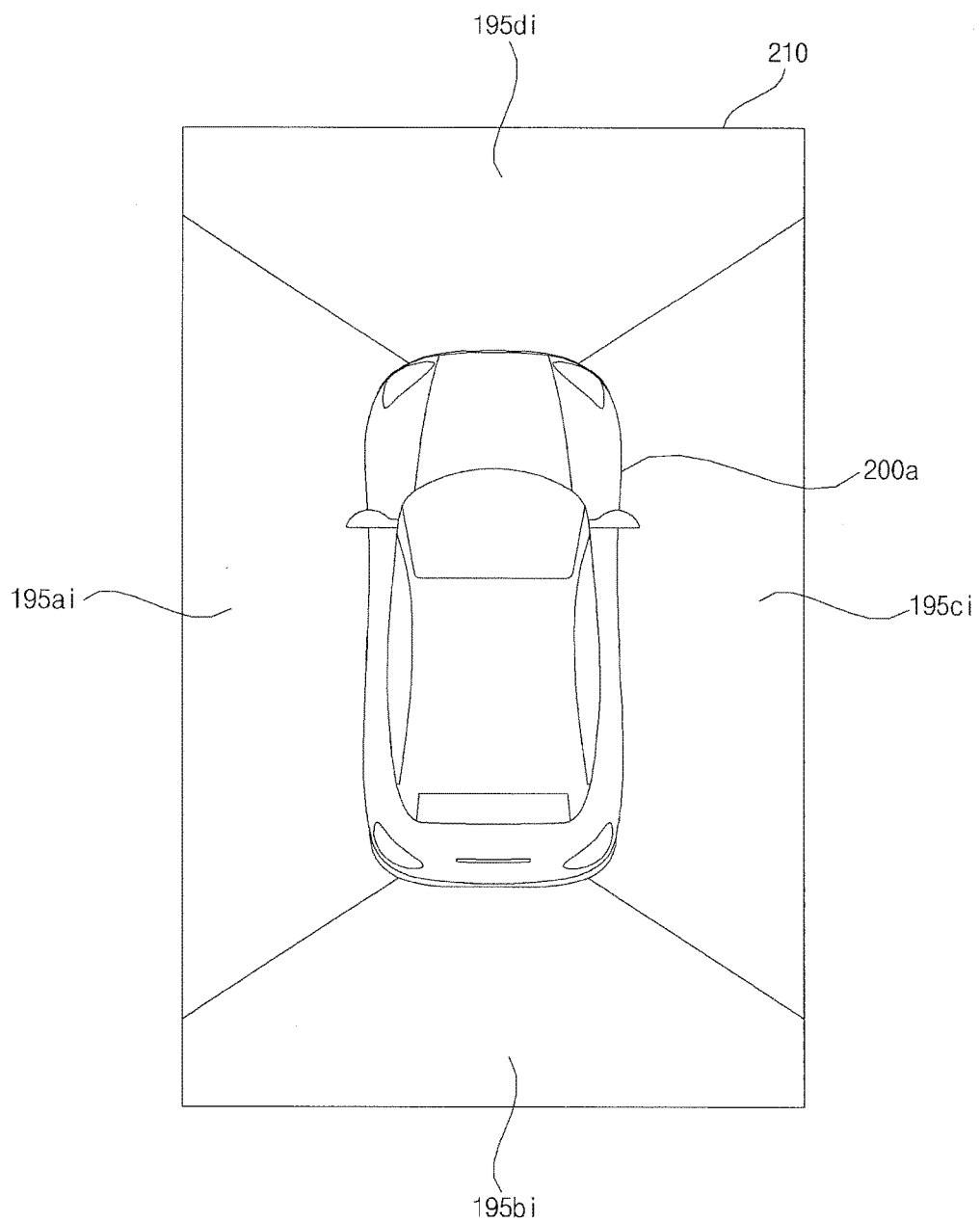
FIG. 2B is a view illustrating an example around view image based on images captured by top view cameras of FIG. 2A.
Figure 2C:
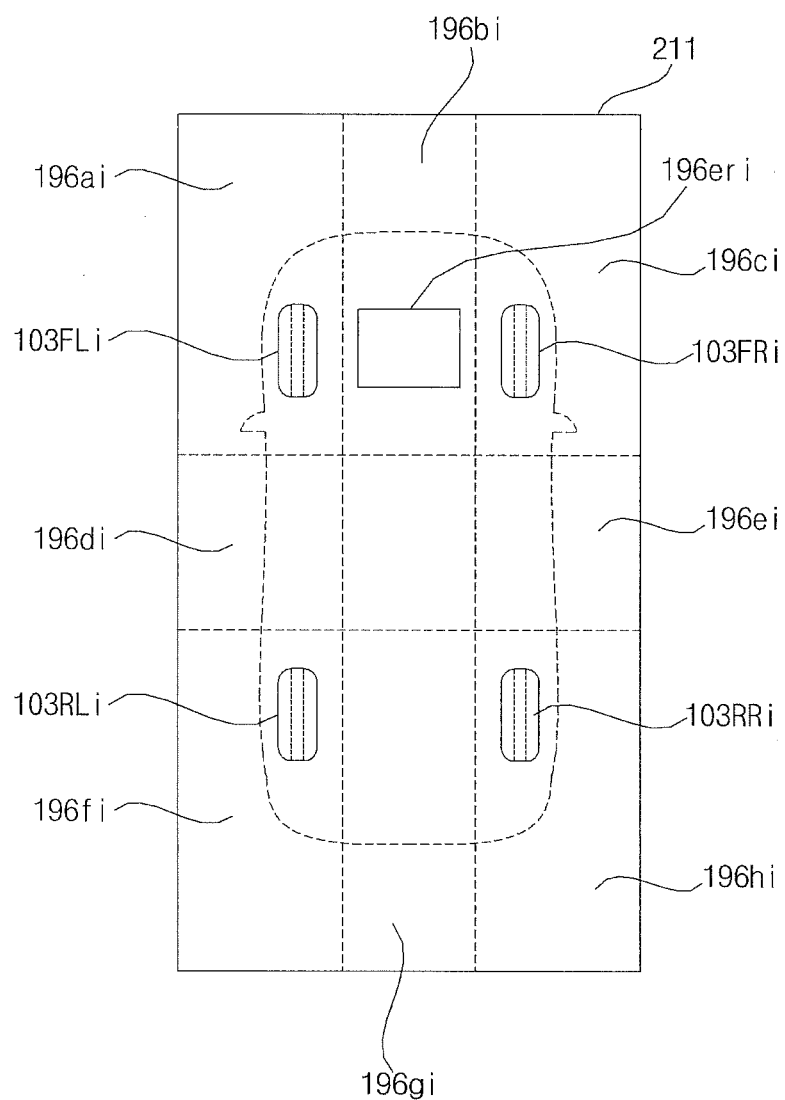
FIG. 2C is a view illustrating an example under vehicle image based on images captured by bottom view cameras of FIG. 2A.

FIG. 2A illustrates an example of positions of a plurality of cameras attached to the vehicle of FIG. 1, FIG. 2B illustrates an example around view image based on images captured by top view cameras of FIG. 2A, and FIG. 2C illustrates an example under vehicle image based on images captured by bottom view cameras of FIG. 2A.

First, referring to FIG. 2A, the around view cameras 195a, 195b, 195c and 195d may be located respectively at the left side, the rear, the right side, and the front of the vehicle.

In particular, the left side view camera 195a and the right side view camera 195c may be located respectively in a case enclosing a left side view mirror and a case enclosing a right side view mirror.

Also, the rear view camera 195b and the front view camera 195d may be located respectively near a trunk switch and at or near an emblem.

A plurality of images captured by the around view cameras 195a, 195b, 195c and 195d may be transmitted to a processor 170 (see FIG. 3A or FIG. 3B) in the vehicle 200. The processor 170 (see FIG. 3A or FIG. 3B) combines the images to generate an around view image.

Further, a plurality of bottom view cameras 196a to 196h may be located respectively at the front, the center, and the rear of the bottom of the vehicle.

First to third bottom view cameras 196a, 196b and 196c may be located at the front of the bottom of the vehicle, fourth and fifth bottom view cameras 196d and 196e may be located at the center of the bottom of the vehicle, and sixth to eighth bottom view cameras 196f, 196g and 196h may be located at the rear of the bottom of the vehicle.

In particular, the first bottom view camera 196a may be located near the front left tire 103FL to capture an image of the front left tire 103FL, the third bottom view camera 196c may be located near the front right tire 103FR to capture an image of the front right tire 103FR, the sixth bottom view camera 196f may be located near the rear left tire 103RL to capture an image of the rear left tire 103RL, and the eighth bottom view camera 196h may be located near the rear right tire to capture an image of the rear right tire.

A plurality of images captured respectively by the bottom view cameras 196a to 196h may be transmitted to the processor 170 (see FIG. 3A or FIG. 3B) in the vehicle 200, and the processor 170 (see FIG. 3A or FIG. 3B) may combine the images to generate an under vehicle image.

In some examples, at least one of the bottom view cameras 196a to 196h may be tilted leftward and rightward, or may be tilted upward and downward.

For example, when the vehicle turns to the right or turns to the left, the bottom view cameras 196a to 196h may be pivotally rotated leftward or rightward. In another example, when the vehicle 200 travels on the inclined road, the bottom view cameras 196a to 196h may be pivotally rotated upward or downward according to an inclination angle of the road.

While FIG. 2A illustrates eight bottom view cameras, alternatively, only four bottom view cameras including the first bottom view camera 196a, the third bottom view camera 196c, the sixth bottom view camera 196f, and the eighth bottom view camera 196h may be provided, or only two bottom view cameras including the second bottom view camera 196b capable of capturing images of the front left 103FL and right tires 103FR and the seventh bottom view camera 196g capable of capturing images of the rear left 103RL and right tires may be provided.

FIG. 2B illustrates an example of an around view image 210. The around view image 210 may include a vehicle image 200a, a first image region 195ai of the left side view camera 195a, a second image region 195bi of the rear view camera 195b, a third image region 195ci of the right side view camera 195c, and a fourth image region 195di of the front view camera 195d.

FIG. 2C illustrates an example of an under vehicle image 211. The under vehicle image 211 may include first to eighth image regions 196ai to 196hi of the first to eighth bottom view cameras 196a to 196h.

As shown, the first image region 196ai of the first bottom view camera 196a may include a front left tire image 130FLi, the second image region 196bi of the second bottom view camera 196b may include an engine room image 196eri, the third image region 196ci of the third bottom view camera 196c may include a front right tire image 130FRi, the sixth image region 196fi of the sixth bottom view camera 196f may include a rear left tire image 130RLi, and the eighth image area 196hi of the eighth bottom view camera 196h may include a rear right tire image 130RRi.

The under vehicle image 211 may assist the driver in checking the state of the underside of the vehicle 200.

In particular, the under vehicle image 211 may assist the driver in checking, for example, the alignment of vehicle tires, tire wear, leakage of engine oil from an engine, deterioration of under vehicle components, and road surface conditions.

Figure 2D:
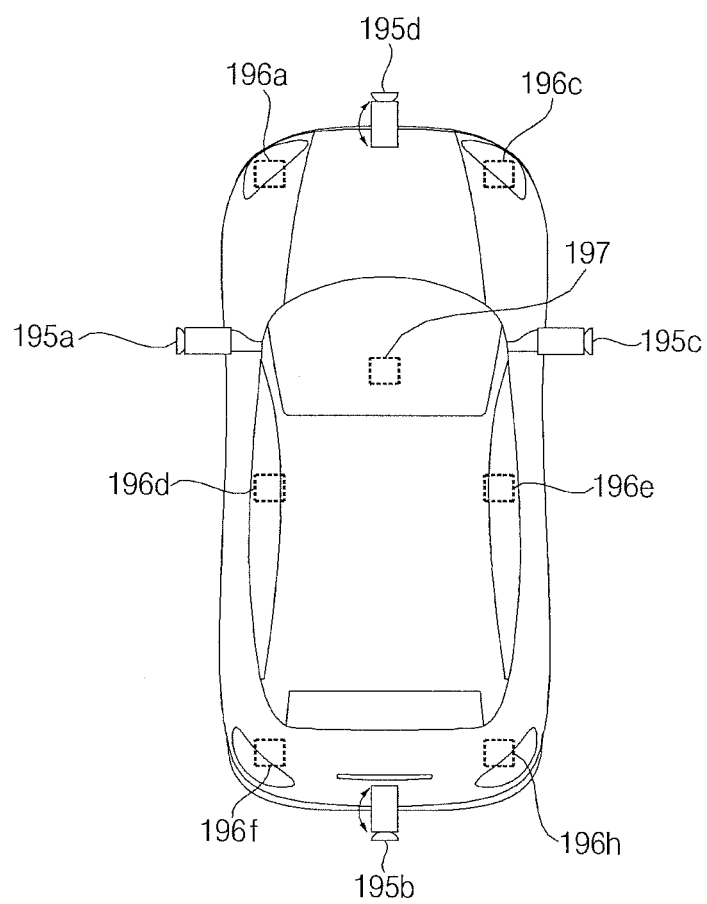
FIG. 2D is a view schematically illustrating another example of positions of a plurality of cameras attached to the vehicle of FIG. 1.

FIG. 2D illustrates another example of positions of a plurality of cameras attached to the vehicle of FIG. 1.

Referring to FIG. 2D, while the arrangement of a plurality of cameras in FIG. 2D is similar to that of FIG. 2B, there is a difference in that the second bottom view camera 196b and the seventh bottom view camera 196g of FIG. 2B are not provided.

In this example, the front view camera 195d and the rear view camera 195b are tiltable and may substitute for functions of the second bottom view camera 196b and the seventh bottom view camera 196g.

That is, to generate an under vehicle image, the front view camera 195d and the rear view camera 195b may be tilted relative to the ground surface so as to capture an image of the underside of the vehicle 200. In addition, to generate an around view image, the front view camera 195d and the rear view camera 195b may be tilted forward or rearward of the vehicle so as to capture a front vehicle image or a rear vehicle image.

Alternatively, differently from FIG. 2B, the first to eighth bottom view cameras 196a to 196h may not be provided and only the front view camera 195d and the rear view camera 195b, which are tiltable and capable of capturing images of vehicle tires, may be provided.

Figure 3A:
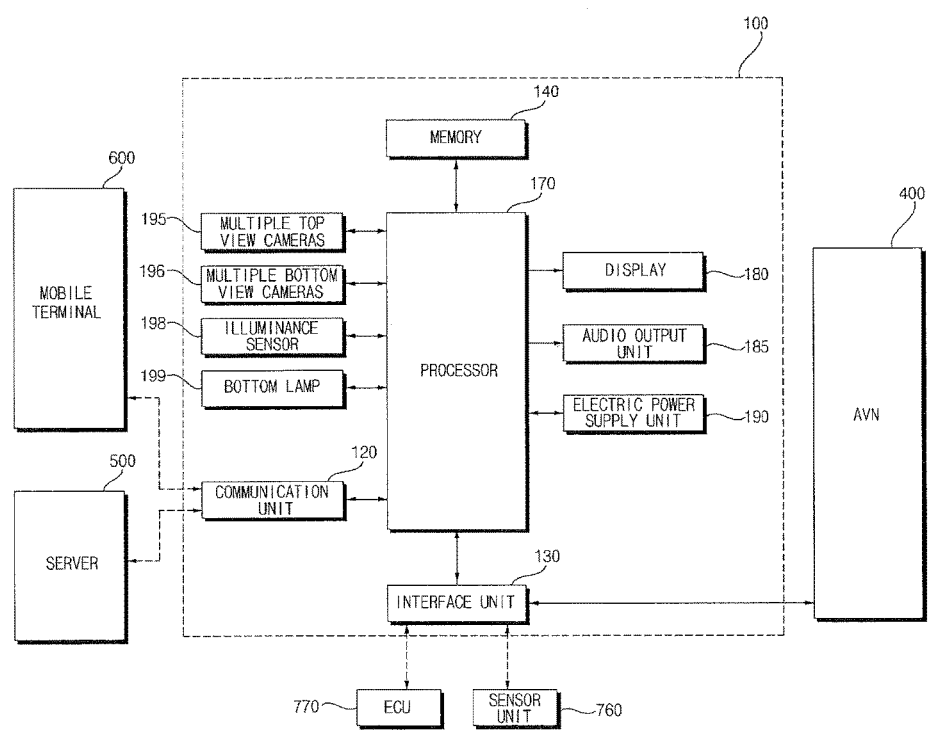
FIGS. 3A and 3B are block diagrams illustrating example internal configurations of an under vehicle image provision apparatus.
Figure 3B:
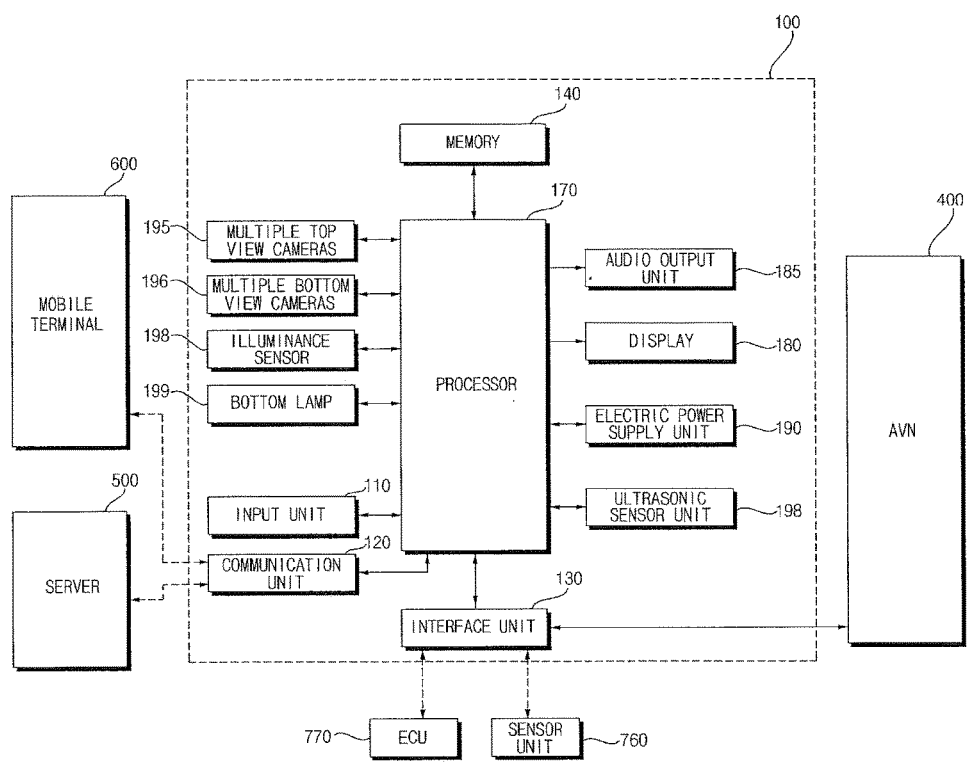

FIGS. 3A and 3B illustrate example internal configurations of an under vehicle image provision apparatus. The under vehicle image provision apparatus 100 of FIGS. 3A and 3B may combine a plurality of images captured by the bottom view cameras 196a to 196h to generate an under vehicle image. In particular, the under vehicle image provision apparatus 100 may generate an around view image showing the underside of the vehicle.

The under vehicle image provision apparatus 100 may perform object detection, verification, and tracking with respect to an object located near the vehicle based on a plurality of images received from the bottom view cameras 196a to 196h.

In some implementations, the under vehicle image provision apparatus 100 may combine a plurality of images captured by the top view cameras 195a to 195d to generate an around view image.

The under vehicle image provision apparatus 100 may perform object detection, verification, and tracking with respect to an object located near the vehicle 200 based on a plurality of images received from the top view cameras 195a to 195d.

First, referring to FIG. 3A, the under vehicle image provision apparatus 100 may include a communication unit 120, an interface unit 130, a memory 140, the processor 170, a display unit 180, an audio output unit 185, an electric power supply unit 190, a plurality of top view cameras 195 (e.g., 195a to 195d), a plurality of bottom view cameras 196 (e.g., 196a to 196h), an indoor camera, a luminance sensor 198, and a bottom lamp 199. In addition, the under vehicle image provision apparatus 100 may further include an audio input unit.

The communication unit 120 may exchange data with a mobile terminal 600 or a server 500 in a wireless manner. In particular, the communication unit 120 may exchange data with a mobile terminal of the driver in a wireless manner. To this end, various wireless data communication protocols, such as Bluetooth, Wi-Fi, Wi-Fi direct, and APiX, may be used.

The communication unit 120 may receive weather information and road traffic state information such as, for example, Transport Protocol Expert Group (TPEG) information, from the mobile terminal 600 or the server 500. In some examples, the communication unit 120 may transmit real-time traffic information, which is acquired by the under vehicle image provision apparatus 100 based on images, to the mobile terminal 600 or the server 500.

When a user gets into the vehicle, the mobile terminal 600 of the user may pair with the under vehicle image provision apparatus 100 automatically or by the user executing an application.

The interface unit 130 may receive vehicle-related data or externally transmit a signal processed or generated by the processor 170. To this end, the interface unit 130 may perform data communication with an Electronic Control Unit (ECU) 770, an Audio Video Navigation (AVN) apparatus 400 and a sensor unit 760 mounted in the vehicle in a wired communication manner or a wireless communication manner.

The interface unit 130 may receive map information related to vehicle travel through data communication with the AVN apparatus 400.

In some implementations, the interface unit 130 may receive sensor information from the ECU 770 or the sensor unit 760.

Here, the sensor information may include at least one selected from among vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, vehicle interior temperature information, and vehicle interior humidity information.

Of the above-specified sensor information, the vehicle heading information, the vehicle position information, the vehicle angle information, the vehicle speed information, and the vehicle tilt information, which are related to vehicle travel, may be referred to as vehicle travel information.

The memory 140 may store various data for operation of the under vehicle image provision apparatus 100 such as, for example, programs for processing or control of the processor 170.

The audio output unit 185 converts an electric signal received from the processor 170 to an audio signal and outputs the audio signal. To this end, the audio output unit 185 may include a speaker, for example. The audio output unit 185 may output sound corresponding to an operation of an input unit, such as a button.

The audio input unit (may receive user voice. To this end, the audio input unit may include a microphone. The audio input unit may convert the received voice into an electric signal and transmit the electric signal to the processor 170.

The processor 170 controls operation of each unit in the under vehicle image provision apparatus 100.

The processor 170 may acquire a plurality of images from the bottom view cameras 196a to 196h and combine the acquired images to generate an under vehicle image, e.g., an under vehicle around view image.

The processor 170 may acquire a plurality of images from the top view cameras 195a to 195d and combine the acquired images to generate an around view image.

Also, the processor 170 may perform signal processing based on computer vision. For example, the processor 170 may calculate disparity for a view around or under the vehicle based on the created under vehicle image or the generated around view image, detect an object in the image based on calculated disparity information, and continuously track motion of the object after detection of the object.

In particular, during detection of the object, the processor 170 may perform lane detection, adjacent vehicle detection, pedestrian detection, and road surface detection, for example.

In addition, the processor 170 may calculate the distance to the detected adjacent vehicle or the detected pedestrian.

In some examples, the processor 170 may receive sensor information from the ECU 770 or the sensor unit 760 through the interface unit 130. Here, the sensor information may include at least one selected from among vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, vehicle interior temperature information, and vehicle interior humidity information.

The display unit 180 may display the under vehicle image or the around view image generated by the processor 170. During display of the under vehicle image or the around view image, the display unit 180 may provide various user interfaces and include a touch sensor to sense a touch input to each user interface.

In some implementations, the display unit 180 may include a cluster or Head Up Display (HUD) mounted at the front of the interior of the vehicle. In a case in which the display unit 180 is the HUD, the display unit 180 may include a projection module to project an image on the front windshield glass of the vehicle 200.

The audio output unit 185 externally outputs sound based on an audio signal processed by the processor 170. To this end, the audio output unit 185 may include at least one speaker.

The electric power supply unit 190 may supply electric power to the respective components under control of the processor 170. In particular, the power supply unit 190 may receive electric power from an in-vehicle battery, for example.

The top view cameras 195a to 195d may be cameras to provide an around view image. These cameras 195a to 195d may be wide-angle cameras.

In addition, an indoor camera mounted in the vehicle to capture an image of a user, more particularly, a driver. The processor 170 may detect the position of the driver based on an image captured by the indoor camera, set a region that cannot be observed by a side view mirror or a rear view mirror based on the position of the driver, and control at least one of the cameras so as to be operated in a first mode, which is referred to as a Blind Spot Detection (BSD) mode in which at least one of the cameras is tilted to capture an image of the region that cannot be observed by the side view mirror or the rear view mirror.

The bottom view cameras 196a to 196h may be cameras to provide an under vehicle image. These cameras 196a to 196h may be wide-angle cameras.

The luminance sensor 198 is a device to sense luminance around the vehicle. The luminance sensor 198 may be used for operation of a front lamp or a rear lamp of the vehicle, or the bottom lamp 199 that will be described below, in order to control the luminous flux of an image captured by the top view cameras 195a to 195d or the bottom view cameras 196a to 196h in the daytime or at night, or in case of rain.

The bottom lamp 199 is operable for acquisition of the sufficient luminous flux of images by the bottom view cameras 196a to 196h arranged at the bottom of the vehicle. For example, when the value of luminance sensed by the luminance sensor 198 is a reference luminance or less, the processor 170 may operate the bottom lamp 199 to control output of light to the underside of the vehicle 200.

In some cases, a plurality of bottom lamps 199 may be provided. In particular, the bottom lamps 199 may be arranged respectively at the front and rear of the bottom of the vehicle, or may be arranged respectively near tires of the vehicle.

Next, referring to FIG. 3B, the under vehicle image provision apparatus 100 of FIG. 3B is similar to the under vehicle image provision apparatus 100 of FIG. 3A except that the under vehicle image provision apparatus of FIG. 3B further includes an input unit 110 and an ultrasonic sensor unit 198. Hereinafter, a description will be given of only the input unit 110 and the ultrasonic sensor unit 198.

The input unit 110 may include a plurality of buttons attached around the display unit 180, or a touchscreen disposed on the display unit 180. The under vehicle image provision apparatus 100 may be powered on through the buttons or the touchscreen such that the under vehicle image provision apparatus 100 can be operated. In addition, the input unit 110 may perform various other input operations.

The ultrasonic sensor unit 198 may include a plurality of ultrasonic sensors. In a case in which the ultrasonic sensors are mounted at a plurality of positions in the vehicle 200, the ultrasonic sensor unit 198 may sense an object around the vehicle based on a difference between transmitted ultrasonic waves and received ultrasonic waves.

Differently from FIG. 3B, Light Detection And Ranging (LiDAR) may be provided instead of the ultrasonic sensor unit 198. Alternatively, both the ultrasonic sensor unit 198 and the LiDAR may be provided.

Figure 4A:
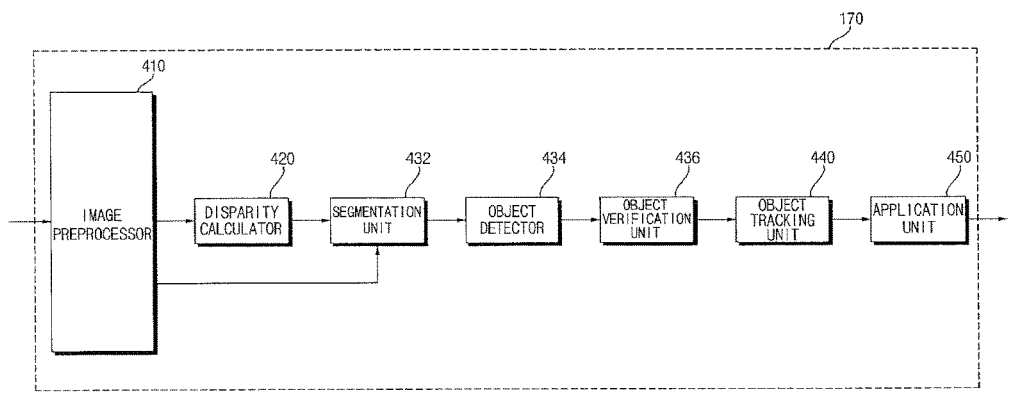
FIGS. 4A and 4B are block diagrams illustrating example internal configurations of a processor of FIG. 3.
Figure 4B:
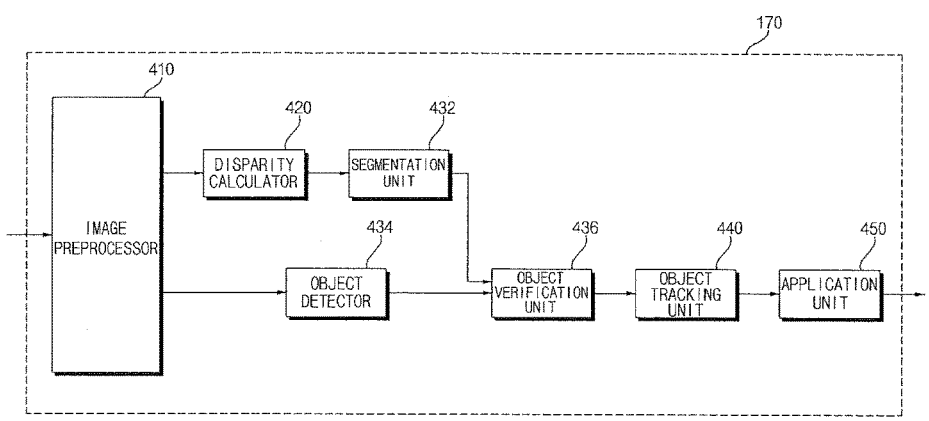
Figure 5:
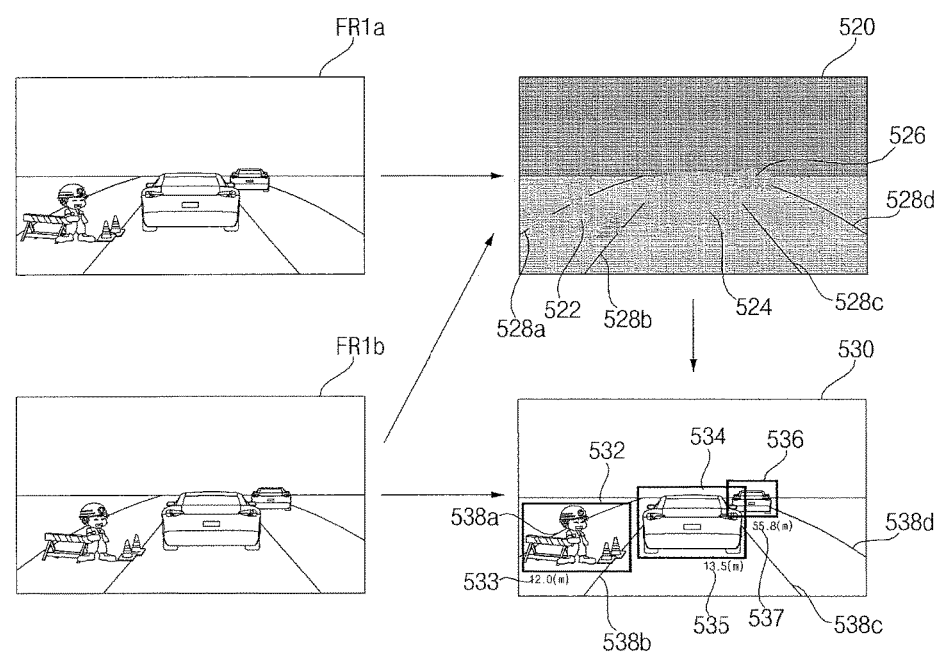
FIG. 5 is a series of views illustrating example object detection performed by the processor of FIGS. 4A and 4B.

FIGS. 4A and 4B illustrate example internal configurations of a processor of FIG. 3, and FIG. 5 is an example series of views illustrating object detection performed by the processor of FIGS. 4A and 4B.

Referring first to FIG. 4A, the processor 170 of the under vehicle image provision apparatus 100 may include an image preprocessor 410, a disparity calculator 420, a segmentation unit 432, an object detector 434, an object verification unit 436, an object tracking unit 440, and an application unit 450.

The image processor 410 may receive a plurality of images from the top view cameras 195a to 195d or a generated around view image and preprocesses the plural images or the generated around view image.

Specifically, the image preprocessor 410 may perform, for example, noise reduction, rectification, calibration, color enhancement, Color Space Conversion (CSC), interpolation, and camera gain control for the plural images or the generated around view image. As a result, the image preprocessor 410 may acquire an image more vivid than the plural images from the top view cameras 195a to 195d or the generated around view image.

The disparity calculator 420 receives the plural images or the generated around view image signal-processed by the image preprocessor 410, sequentially performs stereo matching for the received plural images or the received around view image for a predetermined time, and acquires a disparity map based on the stereo matching. That is, the disparity calculator 420 may acquire disparity information related to a view around the vehicle.

For instance, the stereo matching may be performed on a per pixel basis or on a per prescribed block basis of the images. Also, the disparity map may include a map showing binocular parallax information between images, e.g., left and right images as numerical values.

The segmentation unit 432 may perform segmentation and clustering in the images based on the disparity information from the disparity calculator 420.

Specifically, the segmentation unit 432 may segment at least one of the images into a background and a foreground based on the disparity information.

For example, a region having a predetermined value or less of the disparity information in the disparity map may be calculated as a background, and the region may be excluded. As a result, a foreground may be relatively separated from the image.

In another example, a region having a predetermined value or more of the disparity information in the disparity map may be calculated as a foreground, and the region may be extracted. As a result, the foreground may be separated from the image.

As described above, the image is segmented into the foreground and the background based on the disparity information extracted based on the image. Subsequently, therefore, signal processing speed and signal processing amount may be reduced during detection of an object.

The object detector 434 may detect an object based on an image segment from the segmentation unit 432.

That is, the object detector 434 may detect an object for at least one of the images based on the disparity information.

Specifically, the object detector 434 may detect an object for at least one of the images. For example, the object detector 434 may detect an object from a foreground separated from the image by the image segment.

Subsequently, the object verification unit 436 classifies and verifies the separated object.

To this end, the object verification unit 436 may use, for example, an identification method using a neural network, a Support Vector Machine (SVM) method, an AdaBoost identification method using a Harr-like feature, or a Histograms of Oriented Gradients (HOG) method.

On the other hand, the object verification unit 436 may compare the detected object with objects stored in the memory 140 to verify the detected object.

For example, the object verification unit 436 may verify an adjacent vehicle, a lane, a road surface, a traffic sign, a dangerous zone, and a tunnel, located around the vehicle.

The object tracking unit 440 tracks the verified object. For example, the object tracking unit 440 may verify an object in the images that are sequentially acquired, calculate motion or a motion vector of the verified object, and track movement of the object based on the calculated motion or the calculated motion vector. Consequently, the object tracking unit 440 may track, for example, an adjacent vehicle, a lane, a road surface, a traffic sign, and a dangerous area located around the vehicle.

FIG. 4B illustrates another example internal configuration of the processor 170.

Referring to FIG. 4B, the processor 170 of FIG. 4B is identical in configuration to the processor 170 of FIG. 4A except that a signal processing sequence of the processor 170 of FIG. 4B is different from that of the processor 170 of FIG. 4A. Hereinafter, a description will be given of only the difference between the processor 170 of FIG. 4B and the processor 170 of FIG. 4A.

The object detector 434 may receive a plurality of images or a generated around view image, and detect an object in the plural images or the generated around view image. Differently from FIG. 4A, the object detector 434 may not detect an object for an image segmented based on the disparity information, but directly detect an object from the plural images or the generated around view image.

Subsequently, the object verification unit 436 classifies and verifies the detected and separated object based on the image segment from the segmentation unit 432 and the object detected by the object detector 434.

To this end, the object verification unit 436 may use an identification method using a neural network, anSVM method, an AdaBoost identification method using a Haar-like feature, or a HOG method.

FIG. 5 is an example series of views illustrating an example operation method of the processor 170 illustrated in FIG. 4A or 4B based on images acquired respectively from first and second frame periods.

Referring to FIG. 5, the top view cameras 195a to 195d sequentially acquire images FR1a and FR1b during the first and second frame periods.

The disparity calculator 420 of the processor 170 receives the images FR1a and FR1b signal-processed by the image preprocessor 410, and performs stereo matching for the received images FR1a and FR1b to acquire a disparity map 520.

The disparity map 520 shows a disparity between the images FR1a and FR1b as levels. When a disparity level is high, the distance to the vehicle may be calculated as being short. When a disparity level is low, on the other hand, the distance to the vehicle may be calculated as being long.

In a case in which the disparity map is displayed, the disparity map may be displayed with higher brightness when the disparity level is higher and the disparity map may be displayed with lower brightness when the disparity level is lower.

FIG. 5 shows, by way of example, that, in the disparity map 520, first to fourth lanes 528a, 528b, 528c, and 528d have their own disparity levels and a construction zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the images FR1a and FR1b based on the disparity map 520.

FIG. 5 shows, by way of example, that object detection and object verification for the second image FR1b are performed using the disparity map 520.

That is, object detection and object verification for first to fourth lanes 538a, 538b, 538c, and 538d, the construction zone 532, the first preceding vehicle 534, and the second preceding vehicle 536 in an image 530 may be performed.

In addition, images may be continuously acquired and the object tracking unit 440 may track verified objects.

Figure 6:
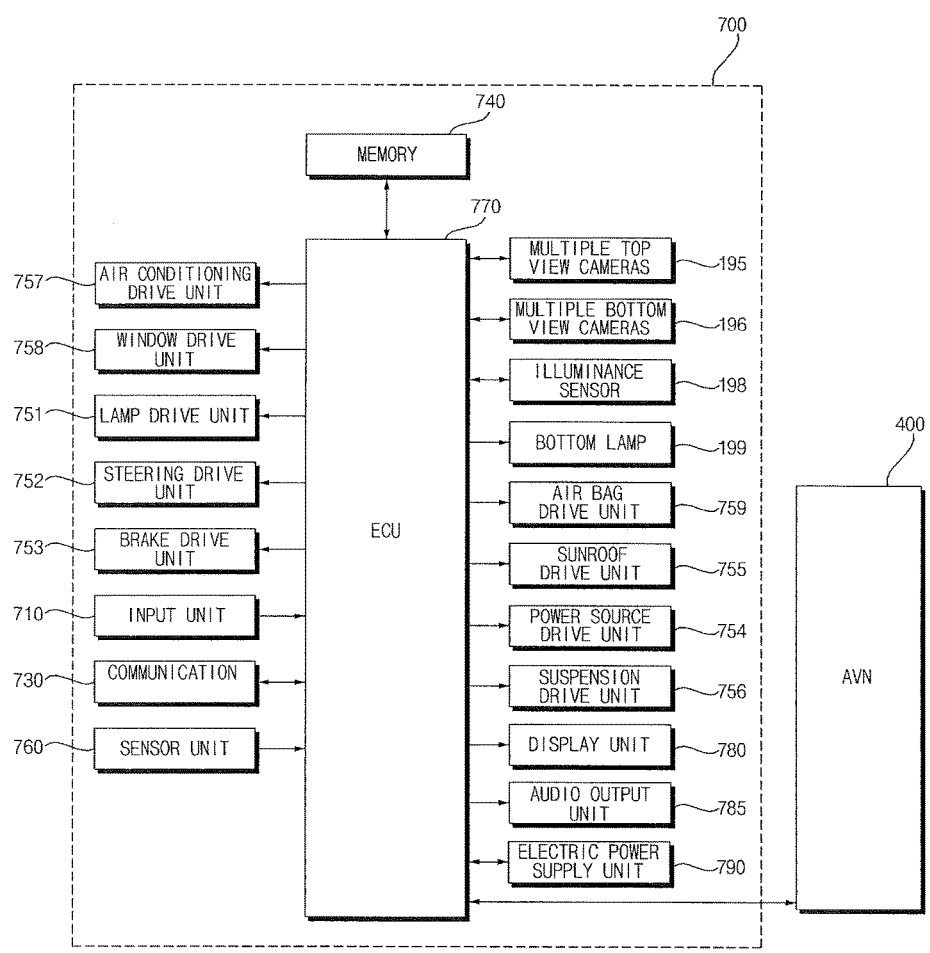
FIG. 6 is a block diagram illustrating an example configuration of a vehicle.

FIG. 6 illustrates an example internal configuration of a vehicle.

Referring to FIG. 6, the vehicle 200 may include an electronic control apparatus 700 for vehicle control. The electronic control apparatus 700 may exchange data with the AVN apparatus 400.

The electronic control apparatus 700 may include an input unit 710, a communication unit 730, a memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, an ECU 770, a display unit 780, an audio output unit 785, an electric power supply unit 790, a plurality of top view cameras 195, a plurality of bottom view cameras 196 (e.g., 196a to 196h), an luminance sensor 198, and a bottom lamp 199.

Also, the ECU 770 may include a processor. Alternatively, an additional processor to signal-process images from the cameras may be provided in addition to the ECU 770.

The input unit 710 may include a plurality of buttons or a touchscreen provided in the vehicle 200. Various input operations may be performed through the buttons or the touchscreen.

The communication unit 730 may exchange data with the mobile terminal 600 or the server 500 in a wireless manner. In particular, the communication unit 720 may exchange data with the mobile terminal 600 of the driver in a wireless manner. To this end, various wireless data communication protocols, such as Bluetooth, Wi-Fi, Wi-Fi Direct, and APiX, may be used.

The communication unit 720 may receive weather information and road traffic state information, such as TPEG information, from the mobile terminal 600 or the server 500.

When a user gets into the vehicle, the mobile terminal 600 of the user may pair with the electronic control apparatus 700 automatically or by the user executing an application.

The memory 740 may store various data for operation of the electronic control apparatus 700, such as programs for processing or control of the ECU 770.

The lamp drive unit 751 may control turn on/turn off of lamps provided inside and outside the vehicle. In addition, the lamp drive unit 751 may control intensity, direction, etc. of light emitted from each lamp. For example, the lamp drive unit 751 may control, for example, a direction indicating lamp and a brake lamp.

The steering drive unit 752 may electronically control a steering device in the vehicle 200. Consequently, the steering drive unit 752 may change a heading of the vehicle 200.

The brake drive unit 753 may electronically control a brake apparatus in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right.

The power source drive unit 754 may electronically control a power source in the vehicle 200.

For example, in a case in which the power source is an engine using fossil fuel, the power source drive unit 754 may electronically control the engine. Consequently, the power source drive unit 754 may control the output torque of the engine.

In another example, in a case in which the power source is an electric motor, the power source drive unit 754 may control the motor. Consequently, the power source drive unit 754 may control, for example, the rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle 200 is high, the air conditioning drive unit 757 may control the air conditioner to supply cool air into the vehicle 200.

The window drive unit 758 may electronically control a window apparatus in the vehicle 200. For example, the window drive unit 758 may control left and right side windows of the vehicle 200 to be opened or closed.

The airbag drive unit 759 may electronically control an airbag apparatus in the vehicle 200. For example, the airbag drive unit 759 may control an airbag to deploy in a dangerous situation.

The sensor unit 760 senses a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, a vehicle interior temperature sensor, and a vehicle interior humidity sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, vehicle interior temperature information, and vehicle interior humidity information.

In addition, the sensor unit 760 may further include, for example, an acceleration pedal sensor, a pressure sensor, an engine speed sensor, an air flow sensor (AFS), an intake air temperature sensor (ATS), a water temperature sensor (WTS), a throttle position sensor (TPS), a top dead center (TDC) sensor, and a crank angle sensor (CAS).

The ECU 770 may control operation of each unit in the electronic control apparatus 700.

The ECU 770 may perform a specific operation based on an input through the input unit 710, receive and transmit a signal sensed by the sensor unit 760 to the under vehicle view provision apparatus 100, receive map information from the AVN apparatus 400, and control operations of the respective drive units 751, 752, 753, 754, and 756.

In addition, the ECU 770 may receive weather information and road traffic state information, such as TPEG information, from the communication unit 730.

In some examples, the ECU 770 may combine a plurality of images received from the top view cameras 195 to generate an around view image. In particular, when the vehicle moves forward at a predetermined speed or less or when the vehicle is driven in reverse, the ECU 770 may generate an around view image.

The display unit 780 may display the generated around view image. In particular, the display unit 180 may provide various user interfaces in addition to the around view image.

In order to display, for example, the around view image, the display unit 780 may include a cluster or an HUD provided at the inside front of the vehicle 200. In a case in which the display unit 180 is the HUD, the display unit 180 may include a projection module to project an image on the front windshield glass of the vehicle 200. Also, the display unit 780 may include a touchscreen to allow input by tapping on the screen.

The audio output unit 785 converts an electric signal received from the ECU 770 into an audio signal and outputs the audio signal. To this end, the audio output unit 785 may include a speaker. The audio output unit 785 may output a sound corresponding to an operation of the input unit 710, e.g., a button.

The electric power supply unit 790 may supply electric power to the respective components under control of the ECU 770. In particular, electric power from an in-vehicle battery may be supplied to the electric power supply unit 790.

The top view cameras 195 are used to provide an around view image. To this end, the top view cameras 195 may include four cameras as illustrated in FIG. 2A. For example, a plurality of around view cameras 195*a*, 195*b*, 195*c*, and 195*d* may be disposed at the left side, the rear, the right side, and the front of the vehicle, respectively. A plurality of images captured by the top view cameras 195 may be transmitted to the ECU 770 or an additional processor.

The bottom view cameras 196 are used to provide an under vehicle image. To this end, the bottom view cameras 196 may include eight cameras as illustrated in FIG. 2A. For example, a plurality of bottom view cameras 196*a* to 196*h* may be disposed at the front, the center, and the rear of the bottom of the vehicle, respectively. A plurality of images captured by the bottom view cameras 196 may be transmitted to the ECU 770 or an additional processor.

The luminance sensor 198 is a device to sense luminance around the vehicle. The luminance sensor 198 may be used for operation of a front lamp or a rear lamp of the vehicle, or the above-described bottom lamp 199, in order to control the luminous flux of an image captured by the top view cameras 195*a* to 195*d* or the bottom view cameras 196*a* to 196*h* in the daytime or at night, or in case of rain.

The bottom lamp 199 is operable for acquisition of the sufficient luminous flux of images by the bottom view cameras 196*a* to 196*h* arranged at the bottom of the vehicle. For example, when the value of luminance sensed by the luminance sensor 198 is a reference luminance or less, the processor 170 may operate the bottom lamp 199 to control output of light to the underside of the vehicle.

In some implementations, a plurality of bottom lamps 199 may be provided. In particular, the bottom lamps 199 may be arranged respectively at the front and rear of the bottom of the vehicle 200, or may be arranged respectively near vehicle tires.

In some examples, the processor 170 or the ECU 770 of the under vehicle image provision apparatus 100 illustrated in FIG. 3A or 3B may generate an under vehicle image including tires of the vehicle based on images transmitted from the bottom view cameras 196. Then, the processor 170 or the ECU 770 may control the display unit 180 or 780 to display the under vehicle image through.

The processor 170 or the ECU 770 of the under vehicle image provision apparatus 100 illustrated in FIG. 3A or 3B may control the display unit 180 to display the alignment state of tires of the vehicle based on the under vehicle image including the tires of the vehicle.

In addition, the processor 170 or the ECU 770 of the under vehicle image provision apparatus 100 illustrated in FIG. 3A or 3B may combine a plurality of images transmitted from the around view cameras 195 to generate an around view image when the travel speed of the vehicle is a first speed or less or when the vehicle is driven in reverse. In this case, the processor 170 or the ECU 770 may generate an around view image including an under vehicle image, and control the display unit 180 or 780 to display the around view image including the under vehicle image.

The processor 170 or the ECU 770 of the under vehicle image provision apparatus 100 illustrated in FIG. 3A or 3B may control the display unit 180 or 780 to display an under vehicle image except for an image of tires of the vehicle when the travel speed of the vehicle is a second speed or more.

The processor 170 or the ECU 770 of the under vehicle image provision apparatus 100 illustrated in FIG. 3A or 3B may control at least one of the bottom view cameras 196 to be moved based on at least one of the travel direction or speed of the vehicle or the tilt of the vehicle.

The processor 170 or the ECU 770 of the under vehicle image provision apparatus 100 illustrated in FIG. 3A or 3B may generate an under vehicle image showing the underside of the vehicle using a plurality of images transmitted from the bottom view cameras 196 at the time of stopping the vehicle, and may also generate an under vehicle image showing tires or an engine room of the vehicle using the images from the bottom view cameras 196 at the time of parking the vehicle or at the time of starting the vehicle.

The processor 170 or the ECU 770 of the under vehicle image provision apparatus 100 illustrated in FIG. 3A or 3B may check the underside of the vehicle for irregularities by comparing an under vehicle image acquired by the bottom view cameras 196 with an under vehicle image stored in the memory 140 at the time of starting the vehicle.

The processor 170 or the ECU 770 of the under vehicle image provision apparatus 100 illustrated in FIG. 3A or 3B may calculate the air pressure of each tire based on an under vehicle image including tires of the vehicle and control output of a tire air pressure injection message based on the calculated air pressure.

The processor 170 or the ECU 770 of the under vehicle image provision apparatus 100 illustrated in FIG. 3A or 3B may vary the tilting angle of at least one of the bottom view cameras 196 based on the tilt of the vehicle. In particular, the processor 170 or the ECU 770 may vary the tilting angle such that the image capture region of at least one of the first and second bottom view cameras 196 increases as the tilt of the vehicle increases during traveling of the vehicle.

The processor 170 or the ECU 770 of the under vehicle image provision apparatus 100 illustrated in FIG. 3A or 3B may output a notification message for a detected object upon detection of a predetermined object in an under vehicle image based on bottom images acquired by the bottom view cameras 196.

The processor 170 or the ECU 770 of the under vehicle image provision apparatus 100 illustrated in FIG. 3A or 3B may calculate a tire wear based on a vehicle tire image included in an under vehicle image and output a tire replacement message based on the calculated tire wear.

The processor 170 or the ECU 770 of the under vehicle image provision apparatus 100 illustrated in FIG. 3A or 3B may determine whether leakage of engine oil occurs based on an under vehicle image and control output of an oil leakage message upon determining that leakage of oil occurs.

The processor 170 or the ECU 770 of the under vehicle image provision apparatus 100 illustrated in FIG. 3A or 3B may identify a road surface from any one of a dry state, a wet state, a snow covered state, and an icy state based on an under vehicle image and control output of information related to the identified road surface state.

The processor 170 or the ECU 770 of the under vehicle image provision apparatus 100 illustrated in FIG. 3A or 3B may calculate the tire temperature of the vehicle based on a thermally sensed image captured by a thermal imaging camera and control output of a warning message when the calculated tire temperature of the vehicle is a predetermined temperature or more.

Hereinafter, example operations of the under vehicle image provision apparatus 100 or the vehicle 200 including the same will be described.

FIGS. 7A to 16 illustrate example operation of the under vehicle image provision apparatus.

Figure 7A:
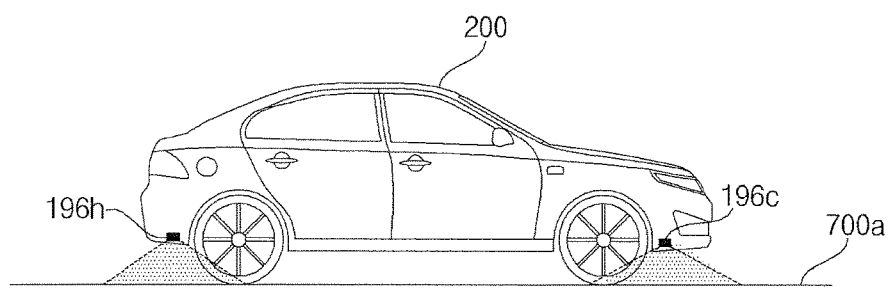
FIGS. 7A to 16 are reference views illustrating example operation of an under vehicle image provision apparatus.

Referring first to FIG. 7A, which is a side view of the vehicle, of the bottom view cameras 196 mounted to the bottom of the vehicle 200 illustrated in FIG. 2A, the third bottom view camera 196c located at the front and the eighth bottom view camera 196h located at the rear are illustrated.

The processor 170 may generate an under vehicle image of the vehicle 200 including tires of the vehicle 200 based on a plurality of images from the bottom view cameras 196 during traveling of the vehicle or at the time of parking the vehicle. In addition, the processor 170 may control the display unit 180 to display the under vehicle image.

In particular, the processor 170 may sense an object such as, for example, a bump or a hole on a road 700a, present at the underside of the vehicle 200 from an under vehicle image at the time of parking the vehicle, which may enhance use convenience of the driver at the time of parking the vehicle. In addition, this may assist the driver in rapidly checking the alignment of tires, resulting in enhanced use convenience of the driver at the time of parking the vehicle.

Figure 7B:
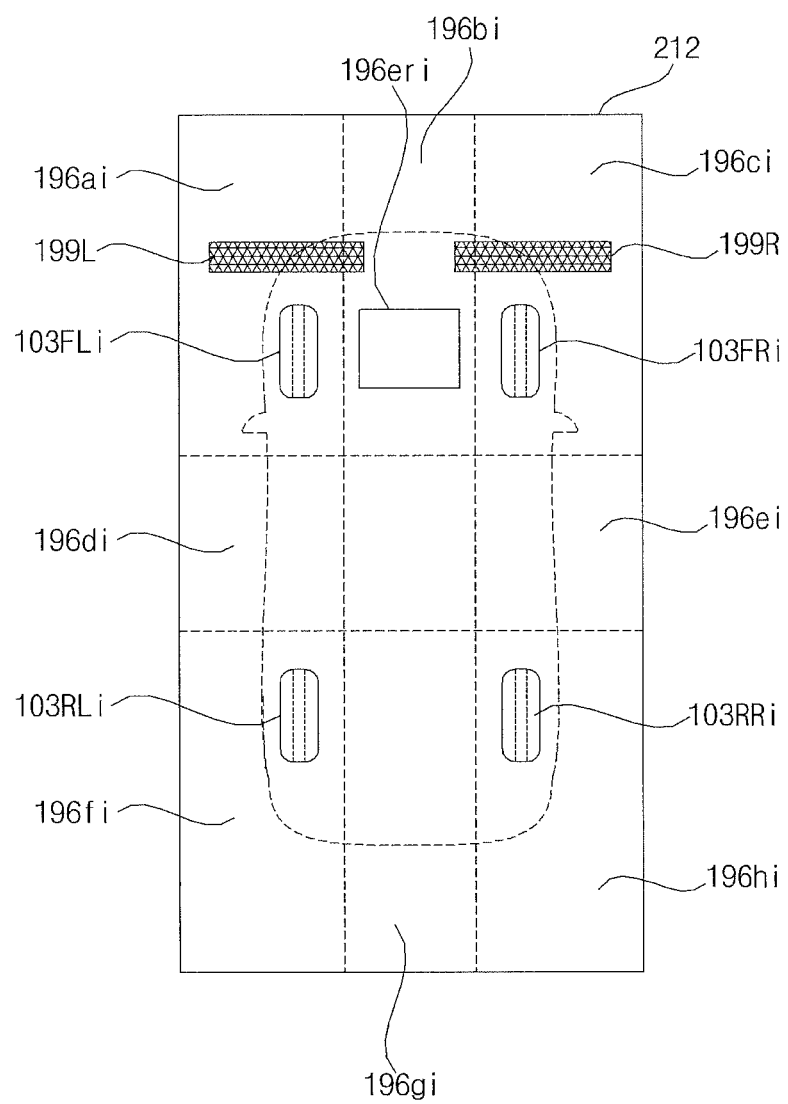

FIG. 7B illustrates an example of an under vehicle image.

Similar to the under vehicle image 211 of FIG. 2C, the under vehicle image 212 of FIG. 7B may include the first to eighth image regions 196ai to 196hi and display tire images.

A difference between the under vehicle image 212 of FIG. 7B and the under vehicle image 211 of FIG. 2C is that bumps 199L and 199R are additionally illustrated at the front of the vehicle in FIG. 7B.

In conclusion, the driver can rapidly detect the bumps 199L and 199R through the under vehicle image 212 at the time of driving the vehicle in reverse or at the time of parking the vehicle.

In addition, the processor 170 may vary the size of an under vehicle image based on the speed of the vehicle.

Figure 7C:
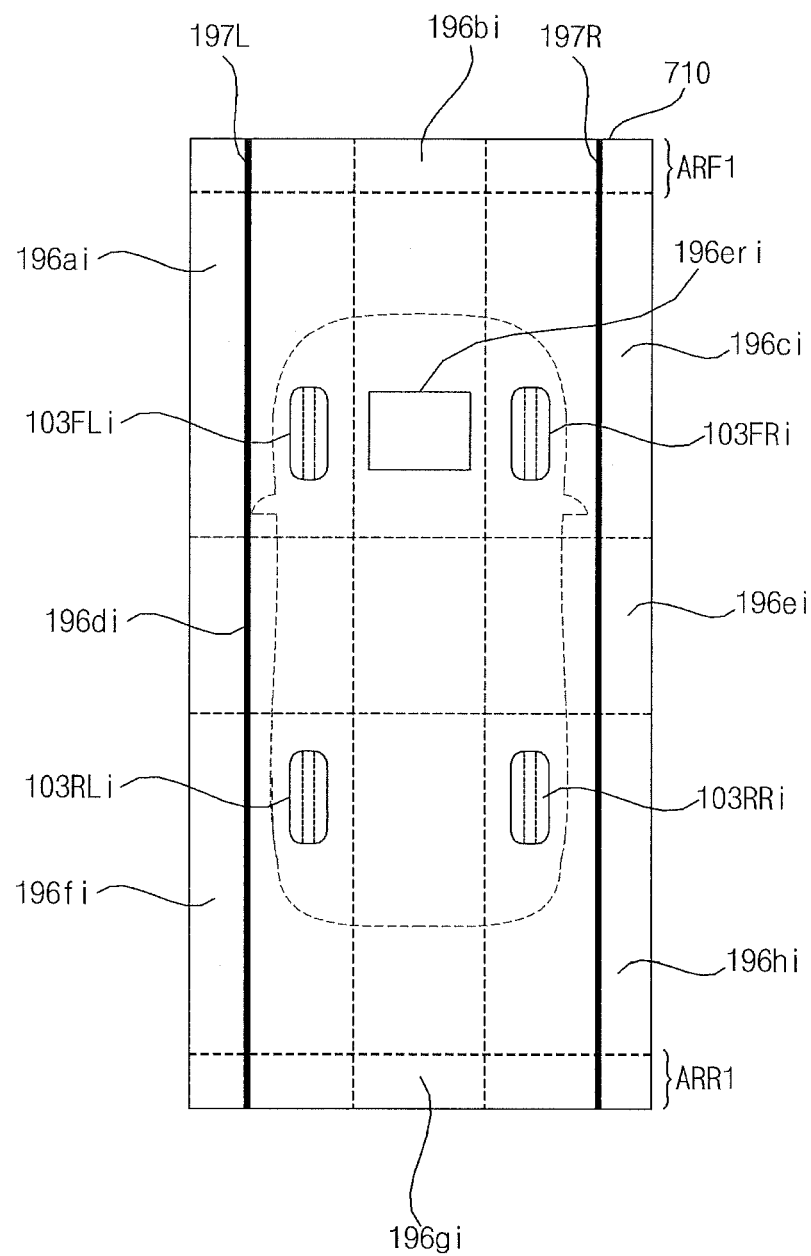
Figure 7D:
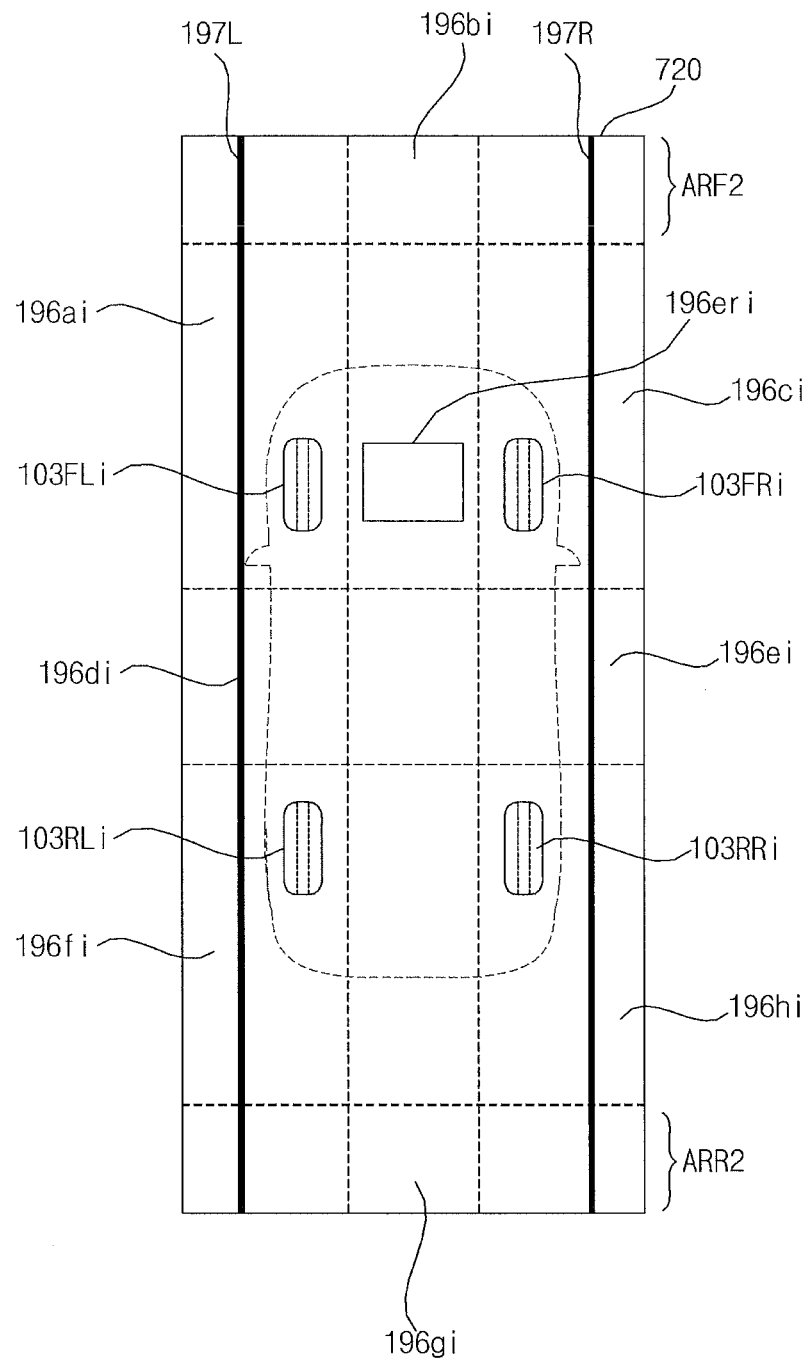

FIG. 7C illustrates an under vehicle image 710 when the vehicle 200 travels at a speed v1, and FIG. 7D illustrates an under vehicle image 710 when the vehicle 200 travels at a speed v2 that is faster than the speed v1.

The processor 170 may control the size of an under vehicle image such that at least one of a front area and a rear area of the under vehicle image is enlarged as the speed of the vehicle increases. To this end, the processor 170 may tilt bottom view cameras which capture a front area image and a rear area image of the under vehicle image respectively (e.g., tilt the bottom view cameras such that an angle between lenses of the bottom view cameras and the ground surface decreases) as the speed of the vehicle increases, so as to allow an image of a wider area to be captured.

FIG. 7C illustrates that a front area ARF1 and a rear area ARR1 of the under vehicle image 710 are increased as compared to the under vehicle image 212 of FIG. 7B, and FIG. 7D illustrates that a front area ARF2 and a rear area ARR2 of the under vehicle image 720 are increased as compared to the front area ARF1 and the rear area ARR1 of the under vehicle image 710 of FIG. 7C.

Accordingly, it is possible to allow the driver to verify an under vehicle image of a wider area when the speed of the vehicle increases, which may ensure safer traveling. Consequently, user convenience may be enhanced.

Also, the under vehicle image 710 of FIG. 7C and the under vehicle image 720 of FIG. 7D may respectively include lanes 197L and 197R on the road.

Accordingly, it is possible to allow the driver to verify, for example, the lanes 197L and 197R and the alignment of tires in the under vehicle images 710 and 720, which may enhance use convenience.

In addition, the processor 170 may vary the size of an under vehicle image based on the gradient of the road during traveling on the road.

For example, the processor 170 may control the size of an under vehicle image such that a front area of the under vehicle image increases when the vehicle travels uphill. In another example, the processor 170 may control the size of an under vehicle image such that a rear area of the under vehicle image increases when the vehicle travels downhill.

In addition, the processor 170 may control at least one of the bottom view cameras 196 to be moved based on the gradient of the road during traveling on the road.

Figure 8A:
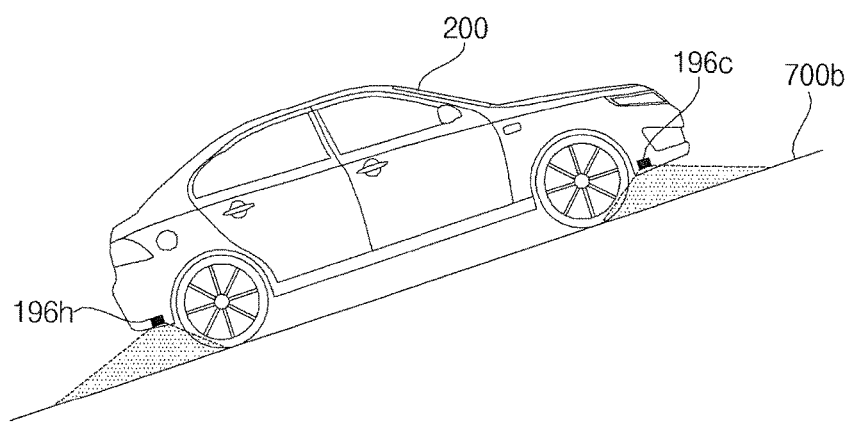
Figure 8B:
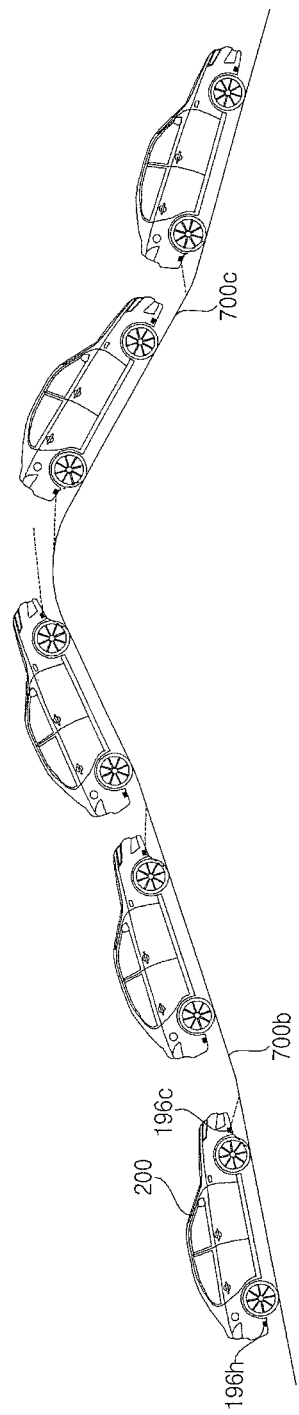
Figure 8C:
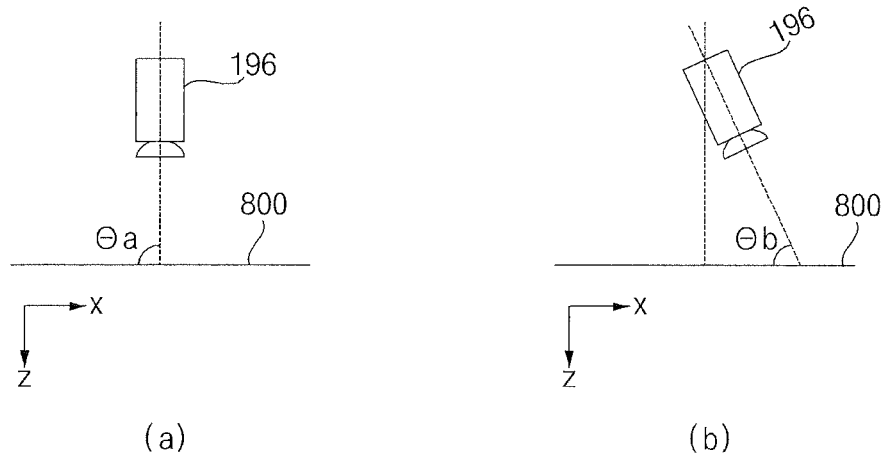

FIGS. 8A-8C illustrate example tilting of the bottom view cameras during traveling on the inclined road.

For example, the processor 170 may tilt the bottom view camera 196 that serves to capture an image of a front area of an under vehicle image upon traveling on an uphill road 700b. That is, the processor 170 may tilt the bottom view camera 196 such that an angle between the ground surface and the bottom view camera 196 decreases.

In particular, the processor 170 may control the bottom view camera 196 such that an angle between the ground surface and a lens of the bottom view camera 196 decreases as the gradient of the uphill road 700b increases. As a result, an image of a wider area may be captured, which may enhance use convenience.

In FIG. 8C, (a) illustrates that an angle $\theta a$ between the bottom view camera 196 and a ground surface 800 is approximately 90 degrees and (b) illustrates that an angle $\theta b$ between the bottom view camera 196 and the ground surface 800 is less than the angle $\theta a$ of (a). Accordingly, a wider image capture area is acquired in (a) of FIG. 8C.

In another example, the processor 170 may tilt the bottom view camera 196 that serves to capture an image of a rear area of an under vehicle image upon traveling on a downhill road 700c. That is, the processor 170 may tilt the bottom view camera 196 such that an angle between the ground surface and the bottom view camera 196 decreases.

In particular, the processor 170 may control the bottom view camera 196 such that an angle between the ground surface and a lens of the bottom view camera 196 decreases as the gradient of the downhill road increases. As a result, a wider image capture area may be acquired, which may result in enhanced use convenience.

When the vehicle heading varies, the processor 170 may vary the size of an under vehicle image based on variation in vehicle heading.

For example, the processor 170 may control an under vehicle image such that a rear area of the under vehicle image instantaneously increases when the vehicle is driven in reverse. To this end, the processor 170 may tilt the bottom view camera 196 that serves to capture an image of the rear area of the under vehicle image (e.g., tilt the bottom view camera 196 such that an angle between the ground surface and a lens of the bottom view camera 196 decreases) when the vehicle is driven in reverse, thereby enabling image capture of a wider area. As a result, user convenience may be enhanced.

In another example, the processor 170 may control an under vehicle image such that a left area of the under vehicle image is instantaneously increased when the vehicle turns to the left. To this end, the processor 170 may tilt leftward the bottom view camera 196 that serves to capture an image of the left area of the under vehicle image when the vehicle turns to the left, thereby enabling image capture of a wider area.

Alternatively, the processor 170 may tilt the bottom view camera 196 that serves to capture an image of the left area of the under vehicle image such that an angle between the ground surface and a lens of the bottom view camera 196 decreases when the vehicle turns to the left, thereby enabling image capture of a wider area.

FIGS. 9A to 9D illustrate example tilting of the bottom view camera 196 when the vehicle 200 turns to the left.

Figure 9A:
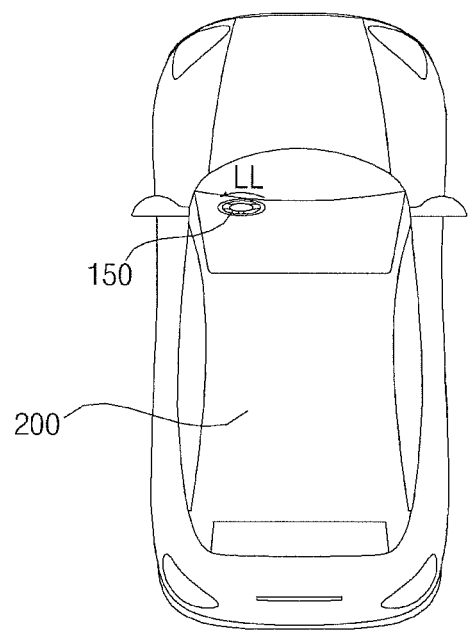

FIG. 9A illustrates example rotation of the steering wheel 150 of the vehicle 200 in a left turn direction LL.

Figure 9B:
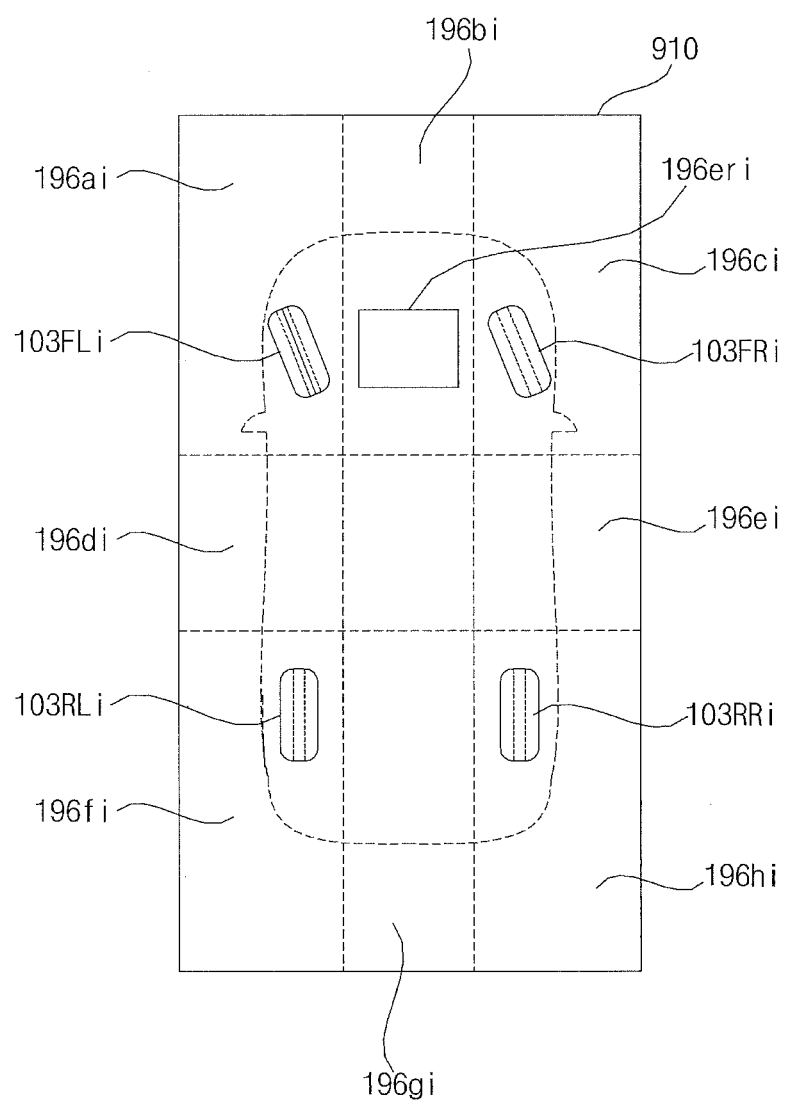

FIG. 9B illustrates an example under vehicle image 910 when the steering wheel 150 of the vehicle 200 is rotated in the left turn direction LL. As illustrated in FIG. 9B, the front left tire 103FLi and the front right tire 103FRi in the under vehicle image 910 are rotated leftward.

Figure 9C:
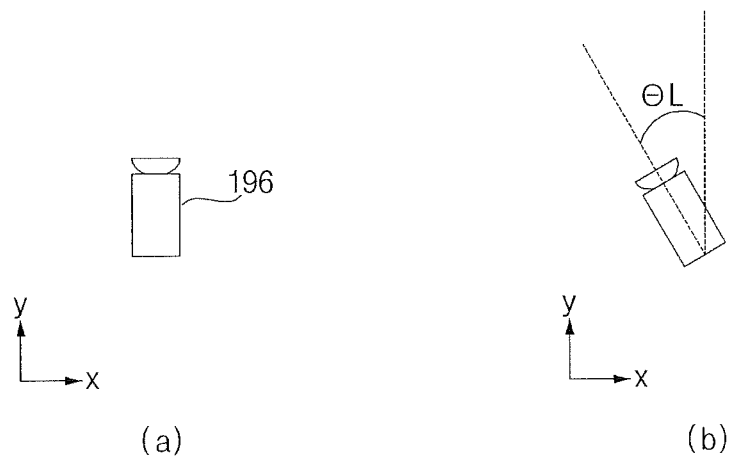

As illustrated in FIG. 9C, the bottom view camera 196 is rotated leftward by an angle of $\theta L$ when the steering wheel 150 of the vehicle 200 is rotated in the left turn direction LL.

Figure 9D:
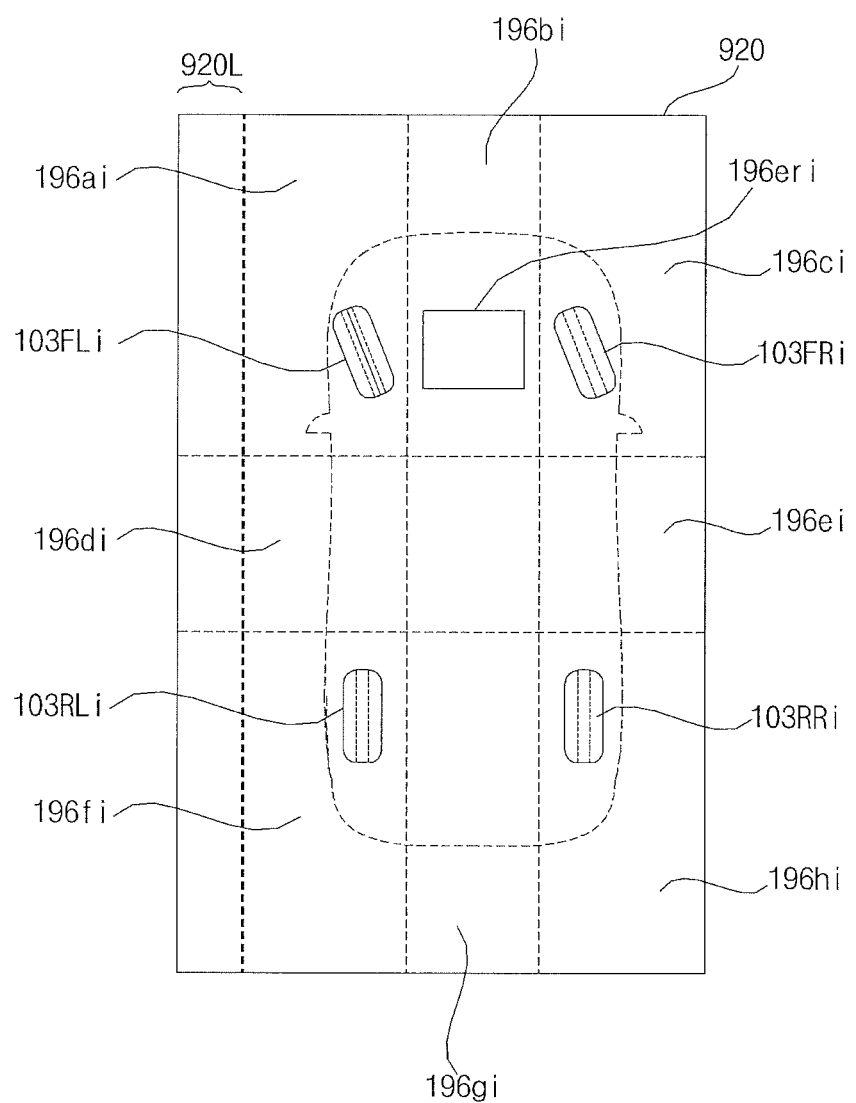

In this way, the processor 170, as illustrated in FIG. 9D, may provide an under vehicle image 920 having an increased left area 920L as compared to FIG. 9B. This may enhance use convenience.

In addition, the processor 170 may display an around view image not including an under vehicle image and an around view image including an under vehicle image according to a user input.

Figure 10A:
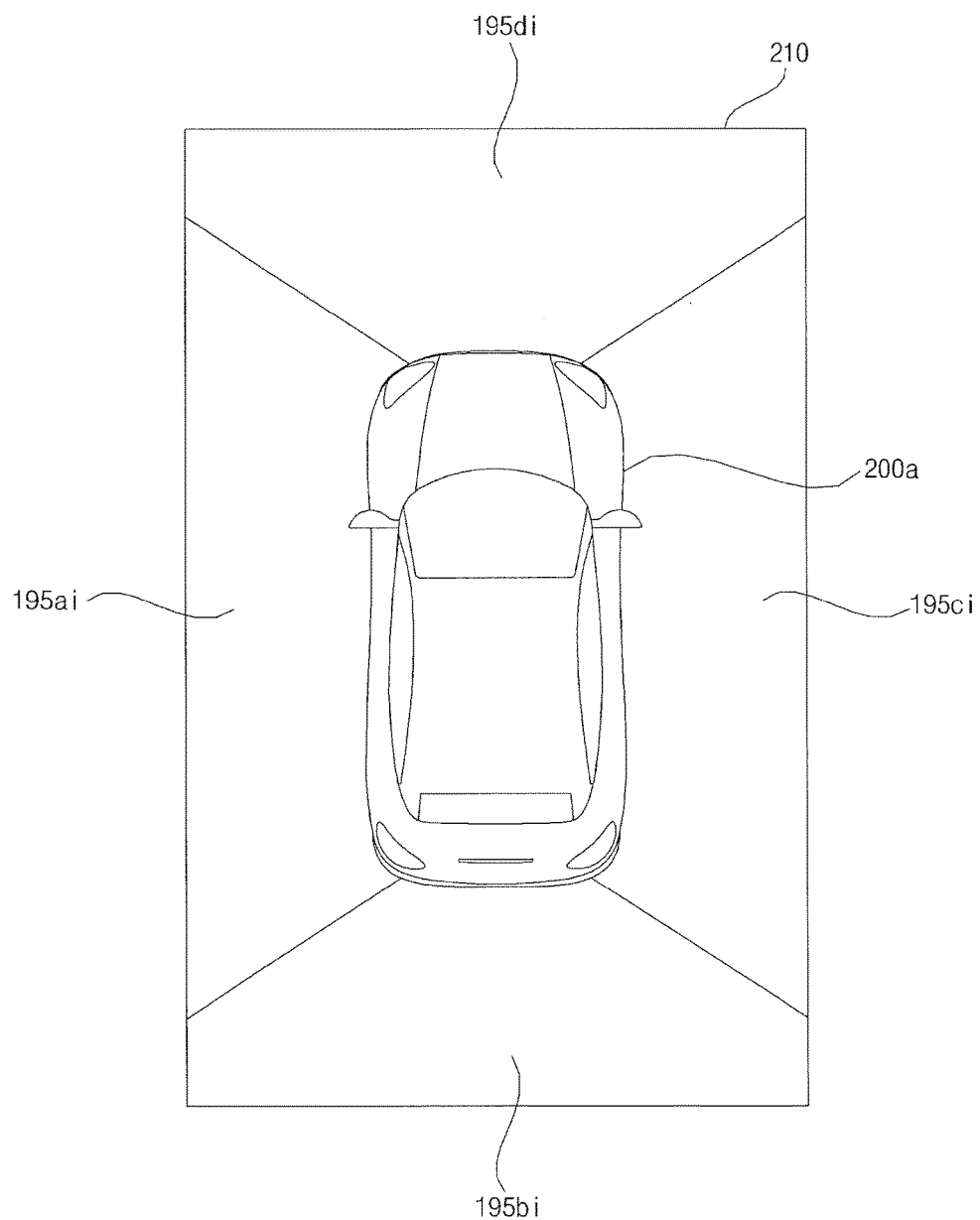
Figure 10B:
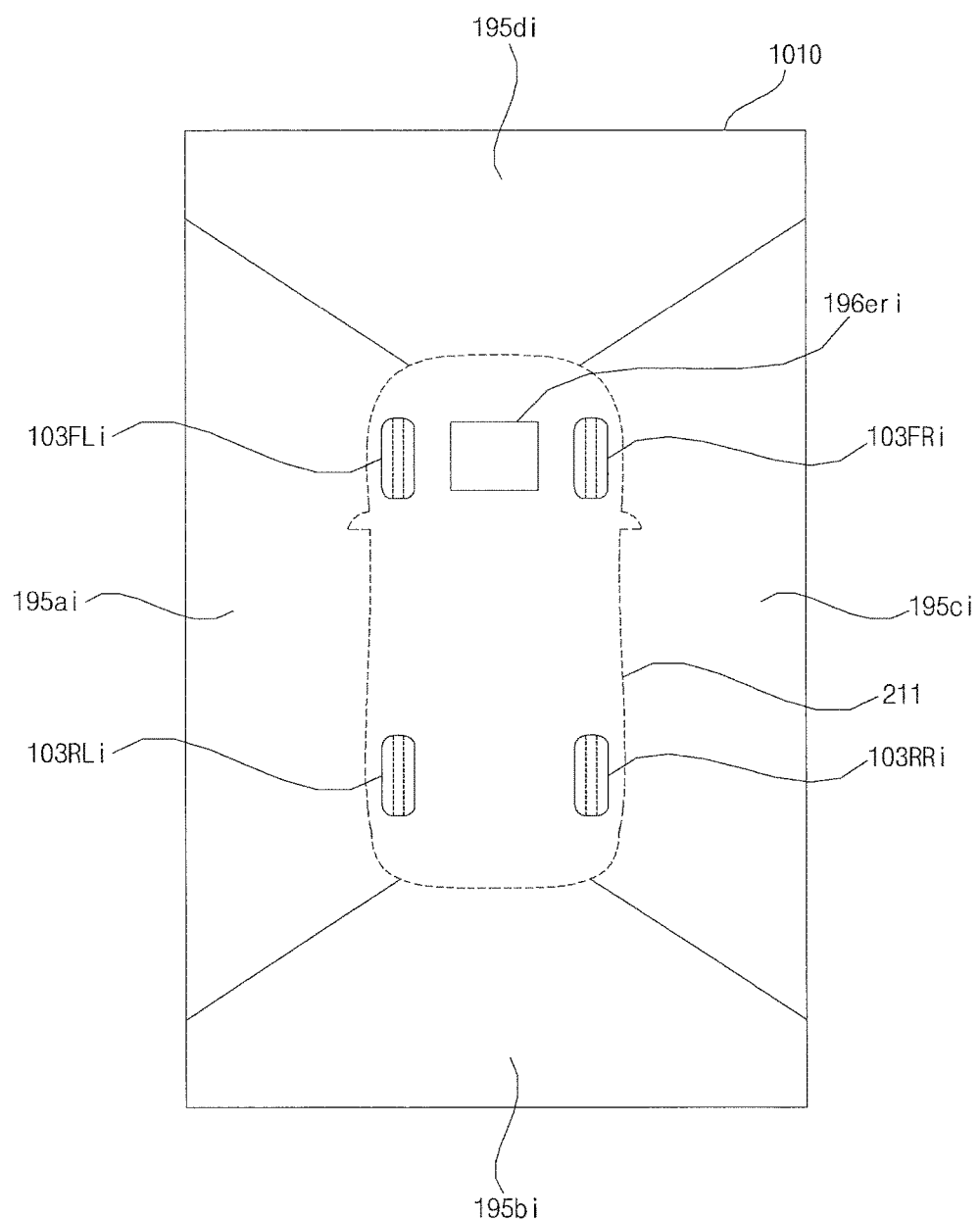

FIG. 10A illustrates an example around view image 210 not including an under vehicle image, and FIG. 10B illustrates an example around view image 1010 including the under vehicle image 211.

For example, when there is a user input to view an around view image not including an under vehicle image during traveling of the vehicle, the processor 170, as illustrated in FIG. 10A, may provide the around view image 210 not including an under vehicle image.

On the other hand, when there is a user input to view an around view image including an under vehicle image during traveling of the vehicle, the processor 170, as illustrated in FIG. 10B, may provide the around view image 1010 including the under vehicle image 211.

In addition, the processor 170 may provide the around view image 210 not including an under vehicle image or the around view image 1010 including the under vehicle image 211 according to the speed of the vehicle 200 regardless of a user input.

For example, the processor 170 may provide the around view image 210 not including an under vehicle image as illustrated in FIG. 10A when the vehicle 200 moves forward beyond a first speed, for example, when the vehicle 200 moves forward at a second speed or more that is faster than the first speed. The processor 170 may provide the around view image 1010 including the under vehicle image 211 as illustrated in FIG. 10B when the vehicle 200 is driven in reverse or when the vehicle 200 moves at the first speed or less.

In addition, the processor 170 may calculate the air pressure of one or more tires based on an under vehicle image of the vehicle 200 including tires and control output of a tire air pressure injection message based on the calculated air pressure.

Figure 11A:
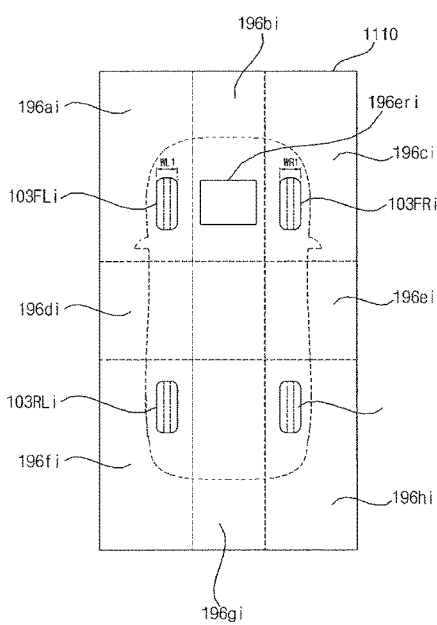
Figure 11B:
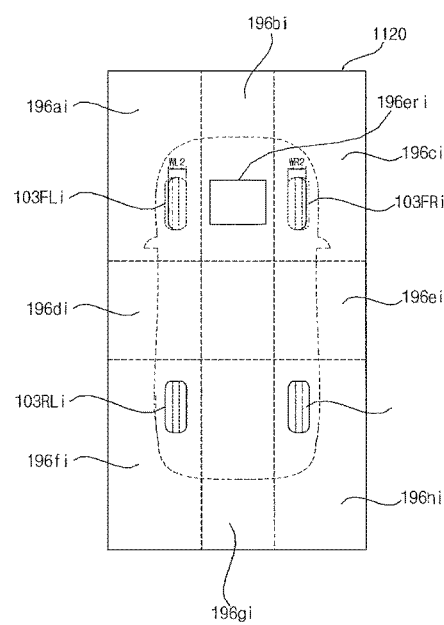

FIG. 11 illustrates an example under vehicle image including tires.

In FIG. 11, (a) illustrates an under vehicle image 1110 stored in the memory 140 and (b) illustrates an under vehicle image 1120 stored in the memory 140.

Comparing the under vehicle image 1110 and the under vehicle image 1120 with each other, the front left tire 130FLi in the under vehicle image 1110 has a width WL1 that is less than a width WL2 of the front left tire 130FLi in the under vehicle image 1120, and the front right tire 103FRi in the under vehicle image 1110 has a width WR1 that is less than a width WR2 of the front right tire 103FRi in the under vehicle image 1120.

Accordingly, the processor 170 may calculate the air pressure of each tire based on, for example, the width and height of the tire in the under vehicle image, and control output of a tire air pressure injection message based on the calculated air pressure.

Alternatively, the processor 170 may calculate the air pressure of each tire based on, for example, a width difference and a height difference between the tires in two under vehicle images, and control output of a tire air pressure injection message based on the calculated air pressure. The message may be output as a video message via the display unit 180, or may be output as an audio message via the audio output unit 185.

The processor 170 may recognize the pattern of a tire by performing object recognition and verification via an image signal processing of an under vehicle image 1110. Then, the processor 170 may calculate a tire wear based on the pattern of the tire (e.g., grooves and protrusions) in the under vehicle image of the vehicle 200, and control output of a tire replacement message based on the tire wear. This message may be output as a video message via the display unit 180, or may be output as an audio message via the audio output unit 185. This may assist the user in recognizing the tire wear.

Also, the processor 170 may determine whether leakage of engine oil occurs based on an under vehicle image of the vehicle 200, and control output of an oil leakage message upon determining that leakage of engine oil occurs. This message may be output as video message via the display unit 180, or may be output as an audio message via the audio output unit 185.

In FIG. 12, (a) is a side view of the vehicle 200 illustrating a case in which there is no leakage of engine oil, and (b) is a side view of the vehicle 200 illustrating a case in which leakage of engine oil occurs.

Figure 12A:
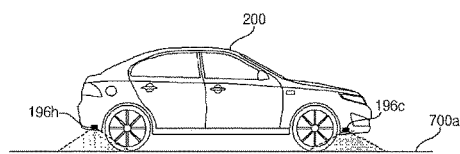
Figure 12B:
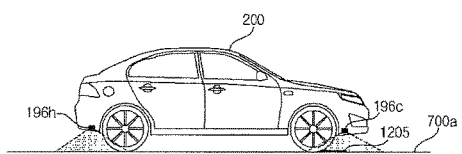
Figure 12C:
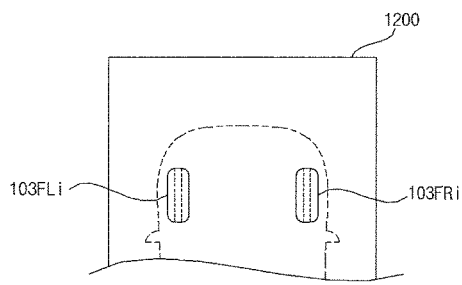
Figure 12D:
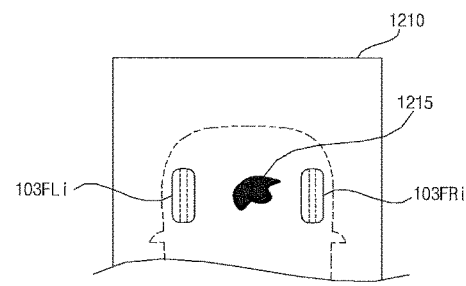
Figure 13A:
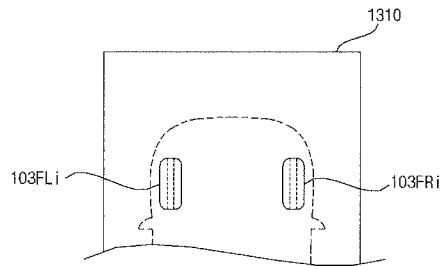
Figure 13B:
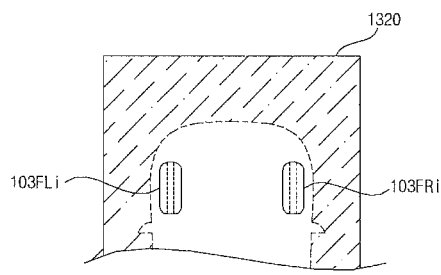
Figure 13C:
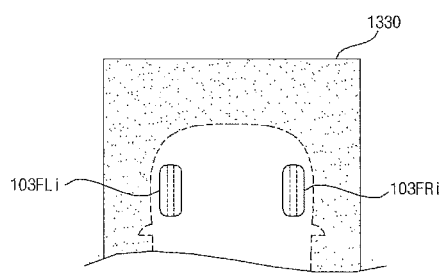
Figure 13D:
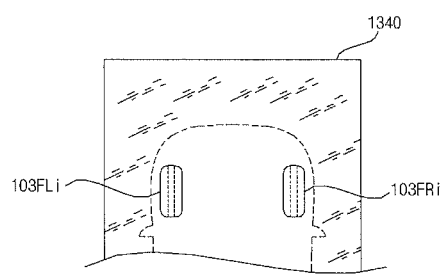

In addition, (c) of FIG. 12 illustrates an under vehicle image 1200 corresponding to FIG. 12(a) in a case in which there is no leakage of engine oil and (d) of FIG. 12 illustrates an under vehicle image 1210 corresponding to FIG. 12(b), which includes a spot 1215 due to leakage of engine oil.

The processor 170 may perform object recognition and verification via an image signal processing in the under vehicle image 1210, and verify the spot 1215 due to leakage of engine oil. Once the spot 1215 is verified, the processor 170 may control output of an oil leakage message. This may assist the user in recognizing leakage of engine oil.

In addition, the processor 170 may identify a road surface from any one of a dry state, a wet state, a snow covered state, and an icy state based on an under vehicle image of the vehicle 200 and control output of information related to the sorted road surface state.

FIG. 13 illustrates examples of under vehicle images including a road surface state.

First, (a) of FIG. 13 illustrates an image 1310 including a road surface and tires 103FLi, 130Fri which are in a dry state.

Subsequently, (b) of FIG. 13 illustrates an image 1320 including a road surface and tires 103FLi, 130FRi which are in a wet state.

Subsequently, (c) of FIG. 13 illustrates an image 1330 including a road surface and tires 103FLi, 130FRi, which are in a snow covered state.

Subsequently, (d) of FIG. 13 illustrates an image 1340 including a road surface and tires 103FLi, 130FRi, which are in an icy state.

The processor 170 may designate the under vehicle images 1310 to 1340 illustrated in (a) to (d) of FIG. 13 into any one of a dry state, a wet state, a snow covered state and an icy state based on differences between frequency spectrums acquired via frequency conversion of the respective images. More specifically, the frequency spectrum of the dry state may have the widest bandwidth, and the bandwidth of the frequency spectrum may be reduced in the sequence of the wet state>the snow covered state>the icy state. Or, the frequency gain of the dry state may be the greatest and the frequency gain may be reduced in the sequence of the wet state>the snow covered state>the icy state.

The processor 170 may identify a road surface state from any one of a dry state, a wet state, a snow covered state, and an icy state based on at least one of the bandwidth of the frequency spectrum or the frequency gain.

In some implementations, the processor 170 may produce and output at least one of a brake drive signal or a steering drive signal corresponding to the sorted road surface state.

For example, in a case in which the user shows a habit or behavior pattern of driving a brake device at the magnitude of level, the processor 170 may output a brake operation weighting signal to the brake drive unit 753 according to a road surface state.

Similarly, the processor 170 may output a steering device operation addition signal to the steering drive unit 752 according to a road surface state.

For example, the processor 170 may determine to provide no addition signal when the road surface is in a dry state. When the road surface is in a wet state, an addition signal may be output to substrate level 0.2 from level 1. When the road surface is in a snow covered state, an addition signal may be output to substrate level 0.3 from level 1. When the road surface is in an icy state, an addition signal may be output to substrate level 0.4 from level 1.

In this way, the level of a steering device operation signal is lowered as the road surface becomes more slippery, e.g., as the road surface varies from a dry state to an icy state, which may result in anti-slip effects based on operation of a steering device.

Figure 14:
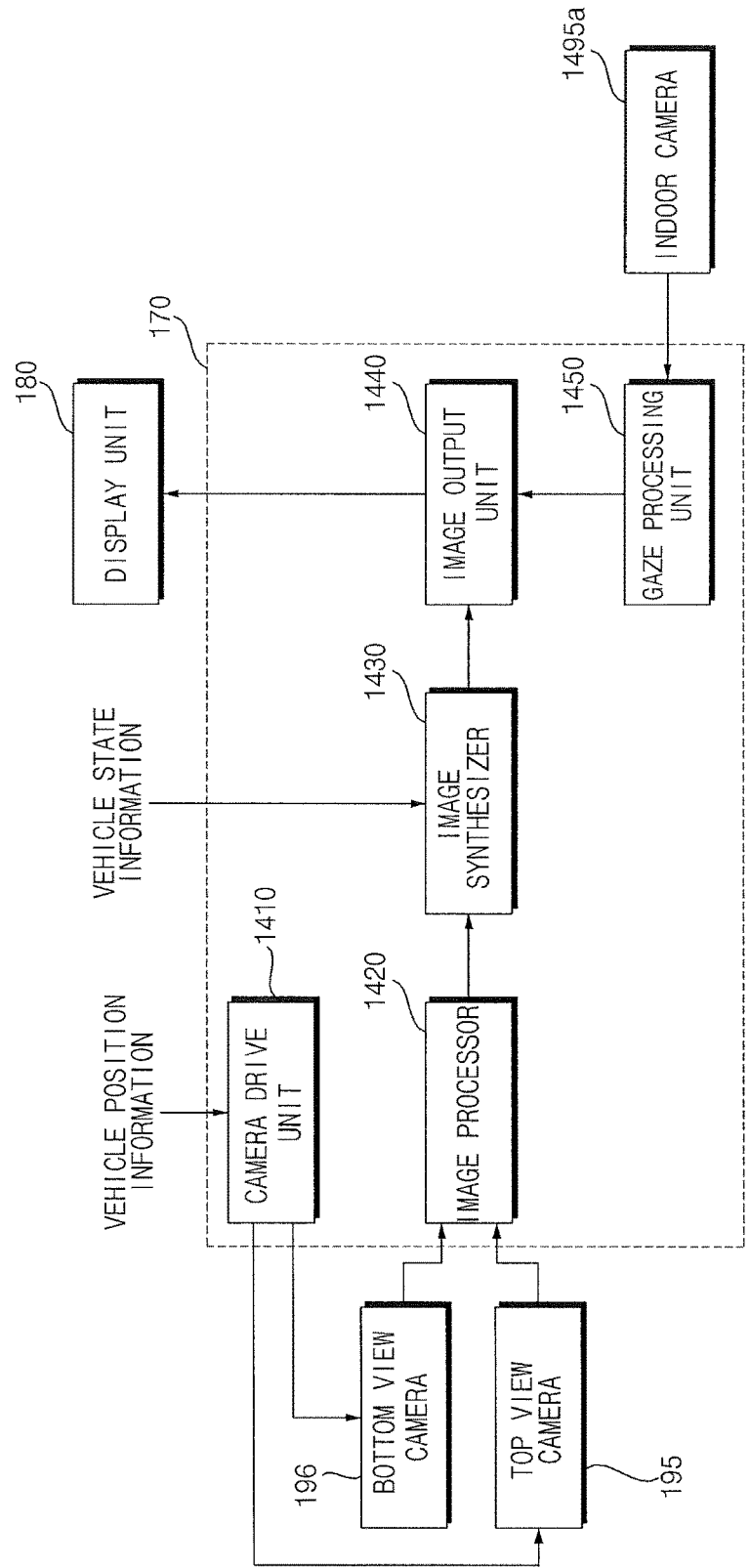

FIG. 14 illustrates another example inner configuration of the processor illustrated in FIGS. 3A and 3B.

Referring to FIG. 14, the processor 170 may include a camera drive unit 1410, an image processor 1420, an image synthesizer 1430, an image output unit 1440, and a driver's gaze processing unit 1450.

The camera drive unit 1410 may control at least one of the bottom view cameras 196 or the top view cameras 195 to be moved according to at least one of the heading or speed of the vehicle 200 or the tilt of the vehicle 200. To this end, the camera drive unit 1410 may receive vehicle location information from an external source.

In particular, the camera drive unit 1410 may control at least one of the bottom view cameras 196 or the top view cameras 195 to be tilted according to at least one of the heading or speed of the vehicle 200 or the tilt of the vehicle 200.

The image processor 1420 may perform a signal processing on each image received from the bottom view cameras 196 or the top view cameras 195.

The image processor 1420 may correspond to the image preprocessor 410 of FIGS. 3A and 3B.

Specifically, the image processor 1420 may perform, for example, noise reduction, rectification, calibration, color enhancement, Color Space Conversion (CSC), interpolation, and camera gain control for each of images received from the bottom view cameras 196 or the top view cameras 195.

The image synthesizer 1430 may synthesize a plurality of images signal-processed in the image processor 1420 to generate an under vehicle image or an around view image. Alternatively, the image synthesizer 1430 may generate an around view image including an under vehicle image.

The image output unit 1440 may output the generated under vehicle image or around view image, or the around view image including the under vehicle image to the display unit 180. In particular, the display unit 180 may convert and output the image in consideration of, for example, resolution of the display unit 180.

In addition, the image output unit 1440 may vary an image display position on the display unit 180 in consideration of the driver's gaze.

The driver's gaze processing unit 1450 may receive an image of a driver captured by the indoor camera 1495a and confirm the driver's gaze via, for example, detection and verification of the driver's eyes. Then, the driver's gaze processing unit 1450 may output, for example, driver's gaze direction information or position information to the image output unit 1440.

Upon provision of an under vehicle image, the image output unit 1440 may vary the position or size of the under vehicle image based on the driver's gaze direction information or position information.

Figure 15:
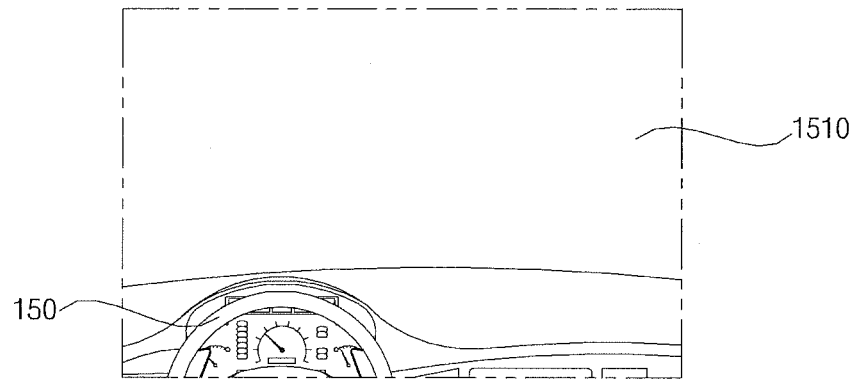
Figure 15:
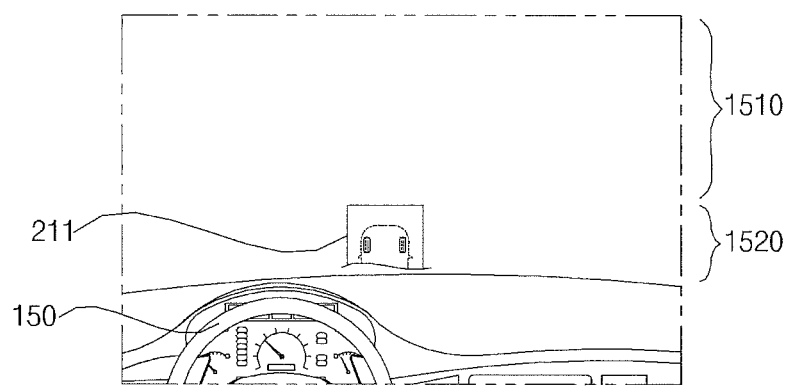

FIG. 15 illustrates example provision of an under vehicle image based on the driver's gaze.

In FIG. 15, (a) illustrates that no under vehicle image is displayed on an image projectable region 1510 of the front windshield glass when the driver's gaze remains focused on the road.

On the other hand, (b) of FIG. 15 illustrates that the under vehicle image 211 is displayed on a lower region 1520 of the image projectable region 1510 of the front windshield glass when the driver's gaze is momentarily directed downward. This may assist the driver in safely and conveniently checking an under vehicle image.

Recognition of the driver's gaze may be implemented using various other methods.

For example, in a case in which the driver wears a wearable device, such as glasses, in a state in which an infrared marker is attached to the front windshield glass of the vehicle, the infrared marker may recognize the position of the wearable device and calculate the driver's gaze based on the recognized position.

Also, the processor 170 may recognize the driver' gaze based on an image acquired by the indoor camera 1495e and vary a tilting angle of at least one of the bottom view cameras 196 based on the driver's gaze.

In some implementations, the vehicle 200 may further include a thermal imaging camera to sense heat at the underside of the vehicle 200, and the processor 170 may calculate the tire temperature of the vehicle 200 based on a thermally sensed image from the thermal imaging camera and control output of a warning message when the calculated tire temperature of the vehicle 200 is a predetermined temperature or more.

Figure 16:
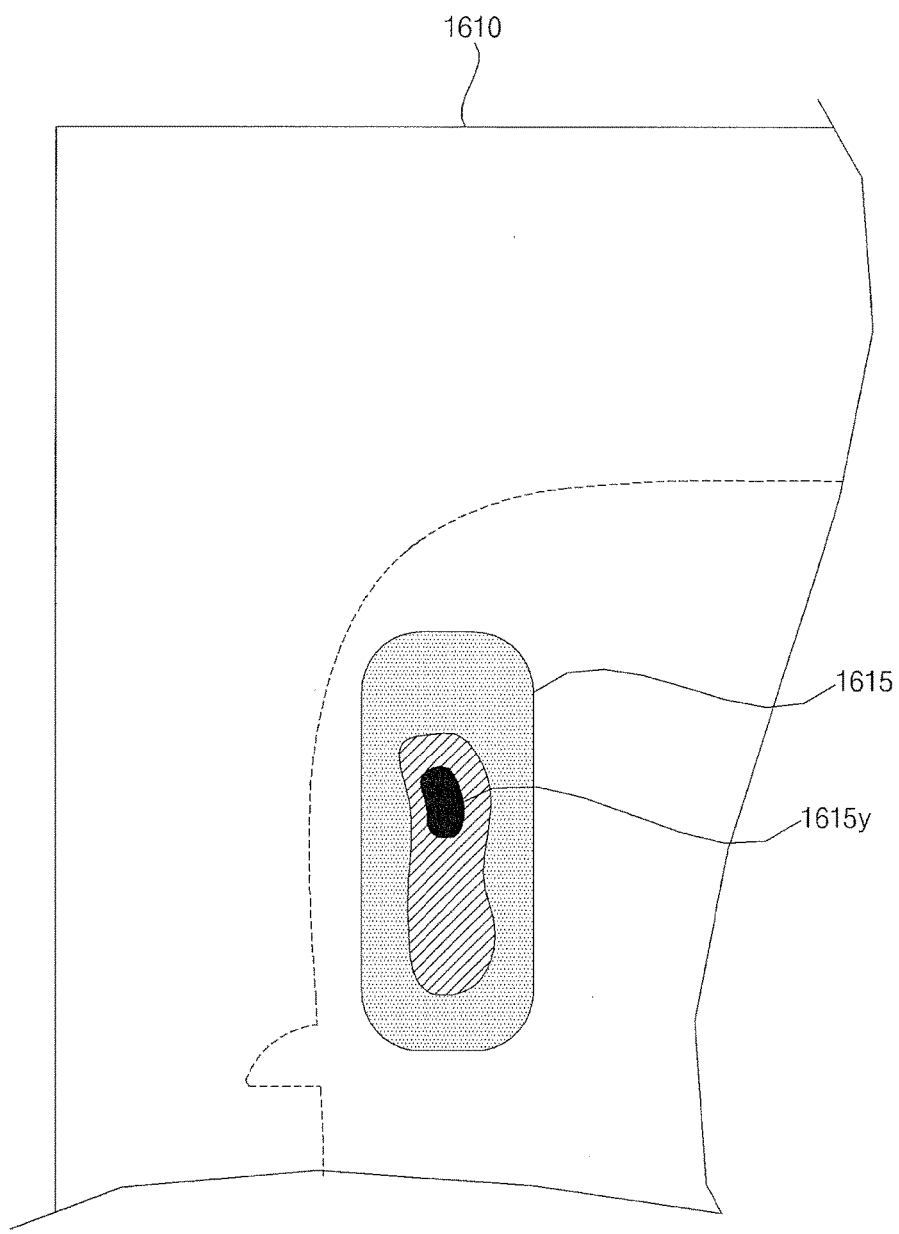

FIG. 16 illustrates an example thermally sensed image including a tire captured by the thermal imaging camera.

Referring to FIG. 16, a thermally sensed image 1610 may be displayed in color corresponding to sensed heat. For example, the thermally sensed image may be closer to yellow as the temperature increases and may be displayed, for example, in green, blue, and purple as the temperature decreases.

The processor 170 may determine that the tire is at a high temperature and thus has a risk of damage when a yellow region is present in the thermally sensed image.

FIG. 16 illustrates that a tire object 1615 is present in the thermally sensed image 1610 and is divided into several regions based on the tire temperature.

In particular, a first region $1516y$ of the tire object 1615 may correspond to a yellow region.

As a result, the processor 170 may detect and verify the first region $1615y$, determine that the tire temperature at the first region $1615y$ is a predetermined temperature or more, and control output of a warning message via, for example, the display unit 180 or the audio output unit 185. This may assist the driver in immediately recognizing a risk of damage to the tire and performing, for example, replacement of the tire. In this way, use convenience may be enhanced.

As is apparent from the above description, an under vehicle image provision apparatus, which is included in a vehicle, may include a plurality of bottom view cameras mounted to the bottom of the vehicle, a processor configured to generate an under vehicle image including tires of the vehicle based on images from the bottom view cameras, and a display unit configured to display the under vehicle image, thereby providing an image showing the underside of the vehicle. In particular, providing the under vehicle image including tires of the vehicle may assist a driver in checking, for example, the alignment of tires and the state of the underside of the vehicle.

The under vehicle image may be provided when the speed of the vehicle is a first speed or less or when the vehicle is driven in reverse. In particular, the under vehicle image may be provided by combining images from the bottom view cameras.

When the speed of the vehicle is a first speed or less or when the vehicle is driven in reverse, an around view image may be generated by combining a plurality of images from a plurality of around view cameras. Providing the under vehicle image simultaneously with provision of the around view image may assist the driver in checking the underside of the vehicle at the time of parking the vehicle or at the time of driving the vehicle in reverse.

In some examples, at least one of the around view cameras may be tilted so as to be used as a vehicle bottom view camera, which may reduce manufacturing costs.

Through comparison between an under vehicle image stored in a memory and a real-time captured under vehicle image, the driver may check the underside of the vehicle for irregularities.

During traveling of the vehicle, at least one of the bottom view cameras may be tilted based on, for example, the gradient of a road, so as to acquire an image covering a wider region around the vehicle, which may increase the driver's field of vision.

When any object is detected at the underside of the vehicle, a warning message with respect to the detected object may be output, which may assist the driver in checking the underside of the vehicle for irregularities.

In addition, a message with respect to tire wear or leakage of engine oil may also be output based on the under vehicle image, which may enhance use convenience.

Further, based on the under vehicle image, a road surface may be identified as any one of a dry state, a wet state, a snow covered state, and an icy state and road surface state information may be output, which may assist or guide safe driving according to the state of the road surface.

In addition, a processor may recognize the position of the driver based on an image from an indoor camera and vary the tilting angle of at least one of the bottom view cameras to correspond to the position of the driver, which enables acquisition of an under vehicle image corresponding to the driver's gaze, resulting in enhanced use convenience of the driver.

An under vehicle image provision apparatus and a method for operating a vehicle may be implemented as code that can be written on a processor-readable recording medium and thus read by a processor provided in the under vehicle image provision apparatus or the vehicle. The processor-readable recording medium may be any type of recording device in which data is stored in a processor-readable manner. Examples of the processor readable recording medium may include a ROM, a RAM, a CD-ROM, a magnetic tape, a floppy disc, and an optical data storage device. Also, the processor readable recording medium may be distributed over a plurality of computer systems connected to a network so that processor readable code is written thereto and executed therefrom in a decentralized manner.

Although example implementations have been disclosed for illustrative purposes, those skilled in the art will appreciate that various modifications, additions and substitutions are possible without departing from the scope and spirit of the disclosure.

What is claimed is:

1. An under vehicle image provision apparatus comprising:
   a plurality of bottom view cameras mounted to a bottom of a vehicle;
   a processor electrically connected to the plurality of bottom view cameras, and configured to generate an under vehicle image including tires of the vehicle by accessing images captured by the plurality of bottom view cameras and combining the accessed images from the bottom view cameras into the under vehicle image;
   a display unit electrically connected to the processor, and configured to display the under vehicle image; and
   a plurality of around view cameras electrically connected to the plurality of bottom view cameras, and located above the plurality of bottom view cameras,
   wherein the processor is configured to generate an around view image by combining a plurality of images accessed from the around view cameras based on a speed of the vehicle being a first speed or less or based on the vehicle being driven in reverse, the around view image including the under vehicle image, and
   wherein the display unit is configured to display the around view image including the under vehicle image.

2. The apparatus according to claim 1, wherein the around view cameras include:
   a front view camera configured to capture an image of a front of the vehicle;
   a rear view camera configured to capture an image of a rear of the vehicle;
   a right side view camera configured to capture an image of a right side of the vehicle; and
   a left side view camera configured to capture an image of a left side of the vehicle, and
   wherein first and second bottom view cameras among the plurality of bottom view cameras are respectively tilted front view and rear view cameras.

3. The apparatus according to claim 1, wherein the processor is configured to control at least one of the bottom view cameras to move based on at least one of a traveling direction, speed, or tilt of the vehicle.

4. The apparatus according to claim 1, wherein the processor is configured to:
   generate the under vehicle image including the underside of the vehicle using the bottom view cameras at a time of stopping the vehicle; and
   generate the under vehicle image including tires or an engine room of the vehicle using the bottom view cameras at a time of parking or starting the vehicle.

5. The apparatus according to claim 1, wherein the processor is configured to vary a tilting angle of at least one of the bottom view cameras based on a tilt of the vehicle.

6. The apparatus according to claim 5, wherein the processor is configured to vary the tilting angle such that an image capture area of at least one of the bottom view cameras increases as the tilt of the vehicle increases during traveling of the vehicle.

7. The apparatus according to claim 1, wherein the processor is configured to output, based on the under vehicle image acquired using the bottom view cameras, a notification message with respect to a predetermined object based on the object being detected in the under vehicle image.

8. The apparatus according to claim 1, wherein the processor is configured to determine whether leakage of engine oil occurs based on the under vehicle image and control output of an oil leakage message upon determining that leakage of engine oil occurs.

9. The apparatus according to claim 1, wherein the processor is configured to identify, based on the under vehicle image, a road surface state from any one of a dry state, a wet state, a snow covered state, and an icy state and control output of information related to the identified road surface state.

10. The apparatus according to claim 1, further comprising a thermal imaging camera configured to sense heat at an underside of the vehicle,
    wherein the processor is configured to calculate a tire temperature of the vehicle based on a thermally sensed image from the thermal imaging camera and control output of a warning message based on the calculated tire temperature of the vehicle being a predetermined temperature or more.

11. The apparatus according to claim 1, wherein the processor is configured to control display of an aligned state of tires of the vehicle on the display unit based on the under vehicle image including the tires of the vehicle.

12. The apparatus according to claim 1, wherein the processor is configured to control display of an under vehicle image excluding an image of tires of the vehicle on the display unit based on a traveling speed of the vehicle being a particular speed or more.

13. The apparatus according to claim 1, further comprising:
    a luminance sensor configured to sense a luminance at the underside of the vehicle; and
    first and second bottom lamps configured to be operated based on the luminance.

14. The apparatus according to claim 1, further comprising an indoor camera mounted in an interior of the vehicle,
   wherein the processor is configured to recognize a driver's gaze based on an image transmitted from the indoor camera and vary a tilting angle of at least one of the bottom view cameras based on the driver's gaze.

15. An under vehicle image provision apparatus comprising:
   a plurality of bottom view cameras mounted to a bottom of a vehicle;
   a processor electrically connected to the plurality of bottom view cameras, and configured to generate an under vehicle image including tires of the vehicle by accessing images captured by the plurality of bottom view cameras and combining the accessed images from the bottom view cameras into the under vehicle image;
   a display unit electrically connected to the processor, and configured to display the under vehicle image; and
   a memory configured to store an under vehicle image captured at a time of parking the vehicle,
   wherein the processor is configured to compare the under vehicle image acquired using the bottom view cameras with the under vehicle image stored in the memory, and, based on the comparison, determine whether any irregularity exists at an underside of the vehicle, at a time of starting the vehicle.

16. An under vehicle image provision apparatus comprising:
   a plurality of bottom view cameras mounted to a bottom of a vehicle;
   a processor electrically connected to the plurality of bottom view cameras, and configured to generate an under vehicle image including tires of the vehicle by accessing images captured by the plurality of bottom view cameras and combining the accessed images from the bottom view cameras into the under vehicle image; and
   a display unit electrically connected to the processor, and configured to display the under vehicle image,
   wherein the processor is configured to:
      calculate an air pressure of each tire based on the under vehicle image including the tires and control output of a tire air pressure injection message based on the calculated tire air pressure, or
      calculate tire wear based on a tire image included in the under vehicle image and control output of a tire replacement message based on the tire wear.

17. A vehicle comprising:
   a steering drive unit configured to drive a steering device;
   a brake drive unit configured to drive a brake device;
   a power source drive unit configured to drive a power source;
   a plurality of bottom view cameras mounted to a bottom of the vehicle;
   a plurality of around view cameras located above the plurality of bottom view cameras;
   a processor electrically connected to the plurality of bottom view cameras, and configured to generate an under vehicle image including an image of tires of the vehicle by accessing images captured by the plurality of bottom view cameras and combining the accessed images from the bottom view cameras into the under vehicle image; and
   a display unit electrically connected to the processor, and configured to display the under vehicle image,
   wherein the processor is configured to generate an around view image by combining a plurality of images accessed from the around view cameras based on a speed of the vehicle being a first speed or less or based on the vehicle being driven in reverse, the around view image including the under vehicle image, and
   wherein the display unit is configured to display the around view image including the under vehicle image.

* * * * *